(12) United States Patent
Guclu et al.

(10) Patent No.: US 12,322,981 B2
(45) Date of Patent: Jun. 3, 2025

(54) SYSTEMS AND METHODS FOR WIRELESS SIGNALING OPERATIONS IN MULTI-SIGNAL ENVIRONMENTS

(71) Applicant: Ossia Inc., Redmond, WA (US)

(72) Inventors: Caner Guclu, Bellevue, WA (US); Hatem Ibrahim Zeine, Woodinville, WA (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 18/637,977

(22) Filed: Apr. 17, 2024

(65) Prior Publication Data

US 2024/0266883 A1 Aug. 8, 2024

Related U.S. Application Data

(63) Continuation of application No. 18/318,640, filed on May 16, 2023, now Pat. No. 11,967,834.

(60) Provisional application No. 63/342,359, filed on May 16, 2022.

(51) Int. Cl.
*H02J 50/20* (2016.01)
*H02J 50/40* (2016.01)

(52) U.S. Cl.
CPC ............ *H02J 50/20* (2016.02); *H02J 50/402* (2020.01)

(58) Field of Classification Search
None
See application file for complete search history.

(56) References Cited

U.S. PATENT DOCUMENTS

| | | | |
|---|---|---|---|
| 2004/0146909 A1* | 7/2004 | Duong | G01N 27/416 702/20 |
| 2010/0219953 A1* | 9/2010 | Bloy | G01S 13/872 705/28 |
| 2012/0157031 A1* | 6/2012 | Strickland | H04B 1/1036 455/307 |
| 2018/0191191 A1 | 7/2018 | Kaushik et al. | |
| 2018/0295557 A1 | 10/2018 | Zeine et al. | |
| 2020/0100115 A1 | 3/2020 | Skaaksrud | |

(Continued)

FOREIGN PATENT DOCUMENTS

| KR | 10-2016-0125048 A | 10/2016 |
|---|---|---|
| WO | 2020/247916 A1 | 12/2020 |

OTHER PUBLICATIONS

International Application No. PCT/US2023/022414, International Search Report, Written Opinion, 9 pages, Sep. 15, 2023.

*Primary Examiner* — Jared Fureman
*Assistant Examiner* — Joel Barnett

(57) ABSTRACT

Systems, methods and computer-readable media according to the present technology enable a receiver to detect and characterize background signals and/or interfering noise to establish a blocker/interferer signal signature, or background signature, for a multi-signal wireless signaling environment. The processes and methods according to present technology can be implemented as a continuous process. Alternatively, where a transmitter and associated receiver operate for wireless signaling according to an expected or predetermined schedule, the processes described herein need not run at all times, but rather can be scheduled for only such times and durations sufficient to achieve the advantageous technical effects. In either case, the present technology provides a power-, memory-, and computation-efficient technique for both the transmitter and the receiver devices.

20 Claims, 8 Drawing Sheets

(56) References Cited

U.S. PATENT DOCUMENTS

| | | | |
|---|---|---|---|
| 2020/0244111 A1* | 7/2020 | Johnston | H02J 50/05 |
| 2020/0328621 A1 | 10/2020 | Zeine et al. | |
| 2021/0135510 A1 | 5/2021 | Lin et al. | |
| 2022/0052560 A1 | 2/2022 | Zeine et al. | |

* cited by examiner

SYSTEMS AND METHODS FOR WIRELESS SIGNALING OPERATIONS IN MULTI-SIGNAL ENVIRONMENTS

CROSS-REFERENCE TO RELATED APPLICATIONS

This application is a continuation of U.S. patent application Ser. No. 18/318,640, filed May 16, 2023, and now allowed; which claims the benefit of and priority to U.S. Provisional Patent Application No. 63/342,359 filed May 16, 2022; each of which is incorporated by reference herein in its entirety.

BACKGROUND

Wireless power transmitters (WPTs) and receiver devices may, in some circumstances, operate in environments having shared physical and frequency spaces. In such contexts, operational challenges for the WPTs and the receiver devices designed to receive wireless power signals from the WPTs may relate to the effectiveness of the WPTs detecting beacon or other signals from the receiver devices. Such challenges may arise when signals in the background are present, which may include signals from other WPT(s) not associated with a particular receiver device. When present, such background signals may "drown out" or otherwise interfere with lower power beacon signals. That is but one example where such interference or noise may pose technical challenges that may potentially be detrimental to intended operational modes. Known approaches to address this issue include time-sharing the air waves, but that approach can reduce the duty cycle available for power delivery by WPTs.

Other signals may be present in such environments that may impact a WPT's ability to identify and process signals from receiver devices and responsively transmit wireless power to them in a targeted manner. One potential detrimental effect may be an increased rate or risk of a WPT falsely processing as a beacon signal from a valid wireless power receiver (WPR) device an aberrant signal or an interferer comprising noise or background with respect to that WPT-WPR pair, instead of a signal pertinent to an associated WPR. This could lead to unintentional transmission of wireless power signals at suboptimal levels or suboptimal target location accuracy, or totally missing the target device due to interference from a receiver device associated with a different WPT.

Similarly, such potential issues that can arise in multi-signal wireless power delivery environments may cause one or more WPRs to be unintentionally neglected by their associated WPT(s), and thus not receive the amount of wireless power necessary to sustain their operation as intended or desired. Where such operational issues exist, a further problem can be a waste of electric power and computing resources resulting from continued processing and transmissions to unintended target locations in the multi-signal wireless power transmission environment.

Accordingly, a need exists for technology that overcomes the problems demonstrated above, as well as one that provides additional benefits. The examples provided herein of some prior or related devices, systems and methods, and their associated limitations, are intended to be illustrative and not exclusive. Other limitations of existing or prior systems will become apparent to those of skill in the art upon reading the following detailed description.

SUMMARY

Systems, methods and computer-readable media according to the present technology enable wireless power transmitters (WPTs) to detect and characterize background signals and/or interfering noise to establish a blocker/interferer signal signature. This may be referred to herein as a background signature, and can be determined according to the present technology during such times that the wireless power transmitter is either or both of: not transmitting wireless power signals to receiver devices, and not receiving beacon or other signals from the receiver device(s) associated with the wireless power transmitter. The processes and methods according to present technology can be implemented as a continuous process. Alternatively, where a WPT and associated receiver device operate for signaling and wireless power transmission according to an expected or predetermined schedule, the processes described herein need not run at all times, but rather can be scheduled for only such times and durations sufficient to achieve the advantageous technical effects. In either case, the present technology provides a power-, memory-, and computation-efficient technique for both the WPT and the wireless power receiver devices (e.g., WPRs).

In some embodiments, an incoming radio frequency (RF) signal is continually processed by components of a WPT to cancel the blocker/interference signal and/or noise component(s) in it. The systems, methods and computer readable media described herein according to the present technology thereby facilitate detecting beacon and other signals specific for the operation of a WPT and associated WPR(s). The beacon signal may have a lower average power or amplitude as compared to the background signals or aggregate noise. The present technology may also prevent, or at least mitigate, undesirable effects of background signal or noise being potentially destructively interfering to operational signals like beacon signals to be eliminated or at least mitigated.

The present technology thus need not be utilized continually by either the WPT or the WPR since the WPT-WPR signaling itself need not be continuous during operation. Following the determination of the background signature, the present technology provides processes that facilitate effective and targeted wireless power delivery to WPRs associated with one or more WPTs such that potential undesired effects of background signals and/or noise is eliminated or at least mitigated.

A first aspect of the disclosure provides a method for operating a wireless power transmission system (WPTS) in a radio frequency (RF) beacon signal receiving mode. The WPTS may be situated in a wireless power delivery environment. The method may include the step of determining a background signature based at least in part on one or more characteristics of a plurality of RF signals sampled via at least one antenna of the WPTS in a first time period. The background signature may have a lower average power or amplitude as compared to an average power or amplitude of the plurality of RF signals. The method may include the step of extrapolating at least part of the background signature for use in a second time window occurring, at least in part, after the first time window. The method may include the step of receiving, via the at least one antenna of the WPTS, the RF beacon signal during the second time window. The method may include the step of identifying a signature of the RF beacon signal in response to receiving the RF beacon signal. The method may include the step of, in response to identifying the signature of the RF beacon signal, transmitting, via the at least one antenna, one or more wireless power signals to a location of a transceiver device from which the RF beacon signal originated.

In a first embodiment of the first aspect of the disclosure, the method may include the steps of: receiving, via the at least one antenna of the WPTS and prior to performing the determining step, a signal instructing the WPTS to enter the RF beacon signal receiving mode; and entering the RF beacon signal receiving mode in response to receiving the signal. In the first, or in a second embodiment, of the first aspect of the disclosure, the background signature may include at least one of: non-random noise, and signals intentionally transmitted into the wireless power delivery environment by RF transmitters for purposes other than operations associated with the WPTS. In the first or second embodiments, or in a third embodiment, of the first aspect of the disclosure, the background signature may include at least part of background RF signals of the wireless power delivery environment. In any of the embodiments of the first aspect of the disclosure as summarized above, the background signature may include, or may be determined from, RF signals having the potential to interfere with receipt of the RF beacon signal via the at least one antenna of the WPTS. Alternatively, the background signature may include, or may be determined from, RF signals that interfere with receipt of the RF beacon signal via the at least one antenna of the WPTS.

In a fourth embodiment of the first aspect of the disclosure, or in any of the embodiments thereof as summarized above, the extrapolating step of the method may include estimating a future progression of the background signature into at least the second time window. In an example of the fourth embodiment, the method may include the step of removing the future progression of the background signature from the signature of the RF beacon signal to facilitate signal processing on at least a portion of the RF beacon signal. In some embodiments, the removing step may include filtering the at least part of the background signature. In any of the above summarized embodiments and examples according to the fourth embodiment of the first aspect of the disclosure, the method may include the step of performing signal processing on the at least a portion of the RF beacon signal. In some embodiments, the at least a portion of the RF beacon signal includes a preamble of the RF beacon signal. In any of the above summarized embodiments and examples according to the fourth embodiment of the first aspect of the disclosure, the performing step may include the step of ascertaining that the transceiver device from which the RF beacon signal originated is authorized to receive the one or more wireless power signals.

In a fifth embodiment of the first aspect of the disclosure, or in any of the embodiments thereof as summarized above, the method may include the step of storing the background signature in a memory storage device of or communicably coupled to the WPTS. In a sixth embodiment of the first aspect of the disclosure, or in any of the embodiments thereof as summarized above, the determining step may be performed continuously in the method. Alternatively, in some embodiments, the determining step may be performed semi-continuously in the method.

In a seventh embodiment of the first aspect of the disclosure, or in any of the embodiments thereof as summarized above, the method may include the step of sampling the plurality of RF signals to facilitate determining the background signature. In an example according to the seventh embodiment of the first aspect, the sampling step of the method may include sampling one or more frequency bands of the plurality of RF signals. In some embodiments, the one or more frequency bands of the plurality of RF signals may include at least one frequency band centered around a WPTS operation band for reception of RF beacon signals via the at least one antenna. In another example according to the seventh embodiment of the first aspect, the sampling step of the method may include: sampling the plurality of RF signals in the time domain, and sampling the plurality of RF signals in the frequency domain. In yet another example according to the seventh embodiment, the sampling step may be performed at least partially concurrently with the determining step in the method. In still another example according to the seventh embodiment, as summarized above, the sampling step may be performed continuously in the method. Alternatively, the sampling step may be performed semi-continuously in the method. In yet another example according to the seventh embodiment of the first aspect of the disclosure, both of the sampling step and the determining step may be performed continuously in the method. Alternatively, both of the sampling step and the determining step may be performed semi-continuously in the method.

In an eighth embodiment of the first aspect of the disclosure, or in any of the embodiments and/or examples thereof as summarized above, the method may include the step of determining the one or more characteristics of a plurality of RF signals. In an example according to the eighth embodiment of the first aspect, the method may include the step of storing the one or more characteristics of the plurality of RF signals in a memory device of or associated with the WPTS.

A second aspect of the disclosure provides a wireless power transmission system (WPTS) for use in a wireless power delivery environment. The system may include at least one antenna, and a controller operably coupled to the at least one antenna. The controller may be configured to determine a background signature based at least in part on one or more characteristics of a plurality of RF signals sampled via at least one antenna of the WPTS in a first time period. The background signature may have a lower average power or amplitude as compared to an average power or amplitude of the plurality of RF signals. The controller may be configured to extrapolate at least part of the background signature for use in a second time window occurring, at least in part, after the first time window. The controller may be configured to receive, via the at least one antenna of the WPTS, the RF beacon signal during the second time window. The controller may be configured to identify a signature of the RF beacon signal, in response to the RF beacon signal being received. The controller may be configured to, in response to the signature of the RF beacon signal being identified, direct the at least one antenna to transmit one or more wireless power signals to a location of a transceiver device from which the RF beacon signal originated.

In a first embodiment of the second aspect of the disclosure, the controller may be configured to: receive, via the at least one antenna, a signal instructing the WPTS to enter an RF beacon signal receiving mode; and enter the RF beacon signal mode receiving in response to the signal being received. In the first, or in a second embodiment, of the second aspect of the disclosure, the background signature may include at least one of: non-random noise, and signals intentionally transmitted into the wireless power delivery environment by RF transmitters for purposes other than operations associated with the WPTS. In the first or second embodiments, or in a third embodiment, of the second aspect of the disclosure, the background signature may include at least part of background RF signals of the wireless power delivery environment. In any of the embodiments of the second aspect of the disclosure as summarized above, the background signature may include, or may be determined from, RF signals having the potential to interfere with receipt of the RF beacon signal via the at least one antenna of the WPTS. Alternatively, the background signature may include, or may be determined from, RF signals that interfere with receipt of the RF beacon signal via the at least one antenna of the WPTS.

In a fourth embodiment of the second aspect of the disclosure, to extrapolate the at least part of the background signature, the controller may be configured to estimate a future progression of the background signature into at least the second time window. In an example of the fourth embodiment, the controller may be configured to remove the future progression of the background signature from the signature of the RF beacon signal to facilitate signal processing on at least a portion of the RF beacon signal. In some embodiments, to remove the future progression of the background signature, the controller may be configured to filter the at least part of the background signature. In any of the above summarized embodiments and examples according to the fourth embodiment of the second aspect of the disclosure, the controller may be configured to perform signal processing on the at least a portion of the RF beacon signal. In some embodiments, the at least a portion of the RF beacon signal includes a preamble of the RF beacon signal. In any of the above summarized embodiments and examples according to the fourth embodiment of the second aspect of the disclosure, to perform the signal processing, the controller may be configured to ascertain that the transceiver device from which the RF beacon signal originated is authorized to receive the one or more wireless power signals.

In a fifth embodiment of the second aspect of the disclosure, or in any of the embodiments thereof as summarized above, the system may include a memory storage device operably coupled to, or in communication with, the controller. In an example according to the fifth embodiment of the second aspect, the controller may be configured to cause the background signature to be stored in the memory storage device. In a sixth embodiment of the second aspect of the disclosure, or in any of the embodiments thereof as summarized above, the controller may be configured to determine the background signature continuously. Alternatively, in some embodiments, the controller may be configured to determine the background signature semi-continuously.

In a seventh embodiment of the second aspect of the disclosure, or in any of the embodiments thereof as summarized above, the controller may be configured to sample the plurality of RF signals to facilitate determining the background signature. In an example according to the seventh embodiment of the second aspect, to sample the plurality of RF signals, the controller may be configured to sample one or more frequency bands of the plurality of RF signals. In some embodiments, the one or more frequency bands of the plurality of RF signals may include at least one frequency band centered around a WPTS operation band for reception of RF beacon signals via the at least one antenna. In another example according to the seventh embodiment of the second aspect, to sample the plurality of RF signals, the controller may be configured to at least one of: sample the plurality of RF signals in the time domain, and sample the plurality of RF signals in the frequency domain. In yet another example according to the seventh embodiment, to sample the plurality of RF signals, the controller may be configured to sample the plurality of RF signals at least partially concurrently with the background signature being determined. In still another example of the system according to the seventh aspect, the controller may be configured to sample the plurality of RF signals continuously. In examples where the plurality of RF signals are sampled continuously by the controller, the controller may be configured to both sample the plurality of RF signals and determine the background signature continuously. Alternatively, in yet another example according to the seventh embodiment of the second aspect of the disclosure, the controller may be further configured to sample the plurality of RF signals semi-continuously. In examples where the plurality of RF signals are sampled semi-continuously by the controller, the controller may be configured to both sample the plurality of RF signals and determine the background signature semi-continuously. In still another example of the system according to the second aspect, the controller may be configured to: sample the plurality of RF signals continuously; and determine the background signature semi-continuously. Alternatively, in yet another example according to the seventh embodiment, the controller may be configured to: sample the plurality of RF signals semi-continuously; and determine the background signature continuously.

In an eighth embodiment of the second aspect of the disclosure, or in any of the embodiments and/or examples thereof as summarized above, the controller may be configured to determine the one or more characteristics of a plurality of RF signals. In an example according to the eighth embodiment of the second aspect, the controller may be configured to cause the one or more characteristics of the plurality of RF signals to be stored in a memory device of or associated with the WPTS.

A third aspect of the disclosure provides one or more non-transitory computer readable media. In some examples, the one or more non-transitory computer readable media may be embodied in a computer program product. The one or more non-transitory computer readable media may have stored thereon program instructions which, when executed by at least one processor (e.g., the controller of the WPTS according to the second aspect of the disclosure), may cause a machine (e.g., the WPTS according to the second aspect) to determine a background signature based at least in part on one or more characteristics of a plurality of radio frequency (RF) signals sampled via at least one antenna of a transceiver in a first time period. The background signature may have a lower average power or amplitude as compared to an average power or amplitude of the plurality of RF signals. When executed by the at least one processor, the program instructions may cause the machine to extrapolate at least part of the background signature for use in a second time window occurring, at least in part, after the first time window. When executed by the at least one processor, the program instructions may cause the machine to identify a signature of an RF beacon signal originating from another transceiver.

In a first embodiment according to the third aspect of the disclosure, when executed by the at least one processor, the program instructions may cause the machine to direct the at least one antenna to receive the RF beacon signal from the another transceiver. In a second, or in the first embodiment according to the third aspect, when executed by the at least one processor, the program instructions may cause the machine to, in response to the signature of the RF beacon signal being identified, direct the at least one antenna of the transceiver to transmit one or more responsive signals to a location of the another transceiver.

In a third embodiment, or in the first or the second embodiments, according to the third aspect of the disclosure, when executed by the at least one processor, the program instructions may cause the machine: receive, via the at least one, a signal instructing the machine to enter an RF beacon signal receiving mode; and enter the RF beacon signal receiving mode in response to the signal being received.

In a fourth embodiment of the third aspect of the disclosure, or in any of the first through third embodiments thereof, the background signature may include at least one of: non-random noise, and signals intentionally transmitted into a wireless signaling environment by RF transmitters for purposes other than operations associated with the machine. In a fifth embodiment of the third aspect, of in any of the first though fourth embodiments thereof, the background signature may include at least part of background RF signals of the wireless signaling environment. In any of the embodiments of the third aspect of the disclosure as summarized above, the background signature may include, or may be determined from, RF signals having the potential to interfere with receipt of the RF beacon signal via the at least one antenna. Alternatively, the background signature may include, or may be determined from, RF signals that interfere with receipt of the RF beacon signal via the at least one antenna.

In a sixth embodiment of the third aspect, of in any of the first though fifth embodiments thereof, when executed by the at least one processor to extrapolate the at least part of the background signature, the program instructions may cause the machine to estimate a future progression of the background signature into at least the second time window. In an example of the system according to the sixth embodiment of the third aspect, when executed by the at least one processor, the program instructions may cause the machine to remove the future progression of the background signature from the signature of the RF beacon signal to facilitate signal processing on at least a portion of the RF beacon signal. In another example according to the sixth embodiment, when executed by the at least one processor to remove the future progression of the background signature, the program instructions may cause the machine to filter the at least part of the background signature. In any of the above summarized embodiments and examples according to the sixth embodiment of the third aspect of the disclosure, when executed by the at least one processor, the program instructions may cause the machine to perform signal processing on the at least a portion of the RF beacon signal. In some embodiments, the at least a portion of the RF beacon signal may include a preamble of the RF beacon signal. In any of the above summarized embodiments and examples according to the sixth embodiment of the third aspect of the disclosure, when executed by the at least one processor to perform the signal processing, the program instructions may cause the machine to ascertain that the another transceiver from which the RF beacon signal originated is authorized to receive one or more responsive signals from the at least one antenna.

In a seventh embodiment of the third aspect of the disclosure, or in any of the embodiments thereof as summarized above, when executed by the at least one processor, the program instructions may cause the machine to cause the background signature to be stored in a memory storage device of, or in communication with, the machine. In an eighth embodiment of the third aspect of the disclosure, or in any of the embodiments thereof as summarized above, when executed by the at least one processor, the program instructions may cause the machine to determine the background signature continuously. Alternatively, in some embodiments, when executed by the at least one processor, the program instructions may cause the machine to determine the background signature semi-continuously.

In a ninth embodiment of the third aspect of the disclosure, or in any of the embodiments thereof as summarized above, when executed by the at least one processor, the program instructions may cause the machine to sample the plurality of RF signals to facilitate the background signature being determined. In an example of the ninth embodiment of the third aspect, when executed by the at least one processor to sample the plurality of RF signals, the program instructions may cause the machine to sample one or more frequency bands of the plurality of RF signals. In some embodiments, the one or more frequency bands of the plurality of RF signals may include at least one frequency band centered around an operation band of the at least one antenna for reception of RF beacon signals via the at least one antenna. In another example of the ninth embodiment, when executed by the at least one processor to sample the plurality of RF signals, the program instructions may cause the machine to at least one of: sample the plurality of RF signals in the time domain, and sample the plurality of RF signals in the frequency domain. In yet another example of the ninth embodiment according to the third aspect of the disclosure, when executed by the at least one processor to sample the plurality of RF signals, the program instructions may cause the machine to sample the plurality of RF signals at least partially concurrently with the background signature being determined. In still another example of the ninth embodiment, when executed by the at least one processor, the program instructions further cause the machine to sample the plurality of RF signals continuously. In examples where the plurality of RF signals are sampled continuously, when executed by the at least one processor, the program instructions may cause the machine to both sample the plurality of RF signals and determine the background signature continuously. In yet another example of the ninth embodiment, when executed by the at least one processor, the program instructions further cause the machine to sample the plurality of RF signals semi-continuously. In examples where the plurality of RF signals are sampled continuously, when executed by the at least one processor, the program instructions may cause the machine to both sample the plurality of RF signals and determine the background signature semi-continuously. In still another example of the ninth embodiment, when executed by the at least one processor, the program instructions further cause the machine to: sample the plurality of RF signals continuously; and determine the background signature semi-continuously. In yet another example of the ninth embodiment of the third aspect of the disclosure, when executed by the at least one processor, the program instructions further cause the machine to: sample the plurality of RF signals semi-continuously; and determine the background signature continuously.

In a tenth embodiment of the third aspect of the disclosure, or in any of the embodiments thereof as summarized above, when executed by the at least one processor, the program instructions may cause the machine to determine the one or more characteristics of a plurality of RF signals. In an example according to the tenth embodiment, when executed by the at least one processor, the program instructions may cause the at least one processor to cause the one or more characteristics of the plurality of RF signals to be stored in a memory device of or associated with the machine.

In an eleventh embodiment of the third aspect of the disclosure, or in any of the embodiments thereof as summarized above, when executed by the at least one processor, the program instructions may cause the machine to, in response to the signature of the RF beacon signal being identified, direct the at least one antenna to transmit one or more responsive signals to a location of the another transceiver. In an example according to the eleventh embodiment of the third aspect, when executed by the at least one processor, the program instructions may cause the machine to ascertain that the another transceiver is authorized to receive the one or more responsive signals prior to the at least one antenna being directed to transmit the one or more responsive signals. In some embodiments, the one or more responsive signals according to the third aspect of the disclosure may be, or may include, one or more wireless power signals. In some embodiments, the wireless signaling environment according to the third aspect of the disclosure may be, or may include, a wireless power delivery environment.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
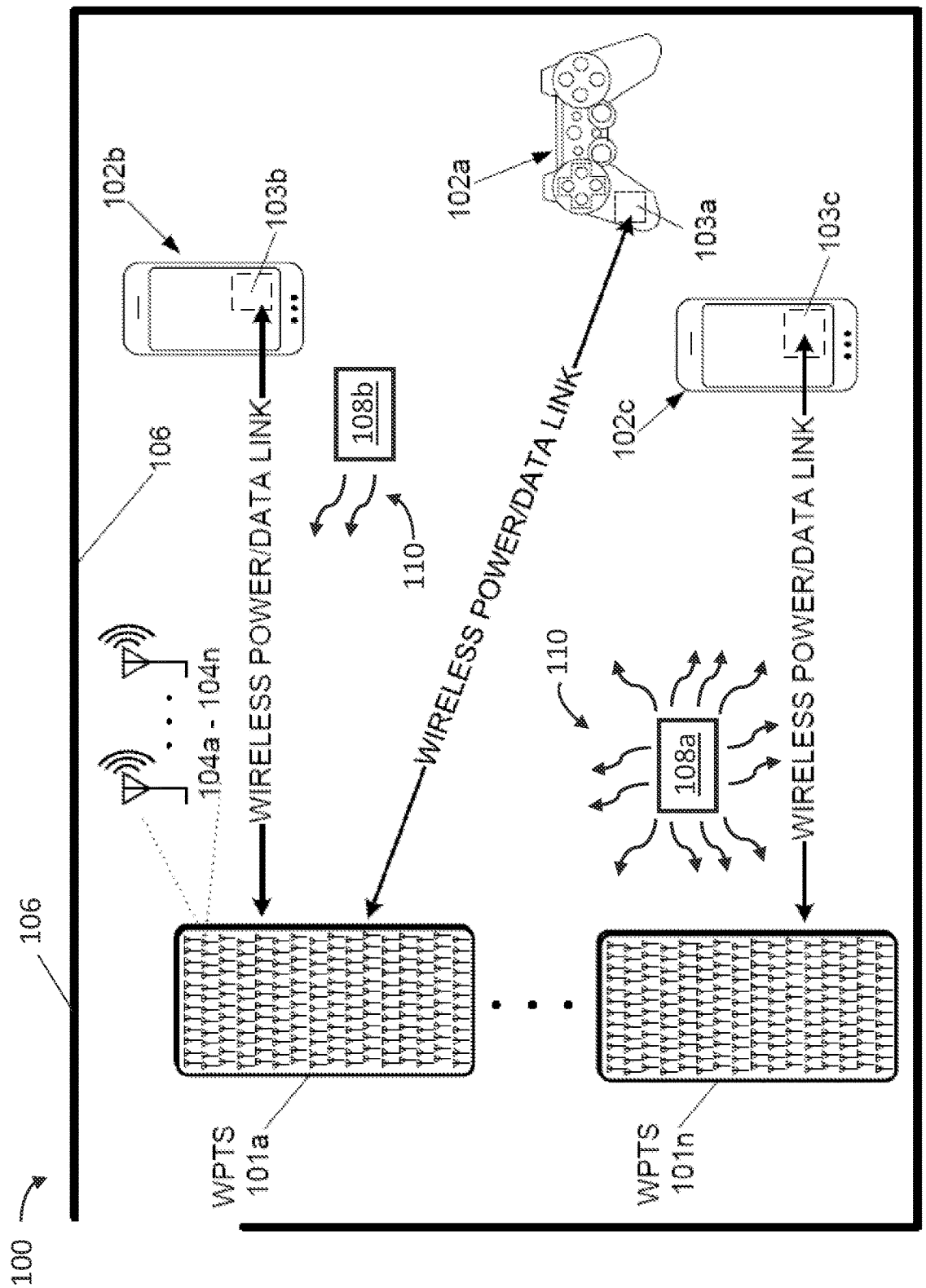
FIG. 1 is a block diagram of a wireless power delivery environment, in accordance with certain embodiments of the present technology.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Systems, methods and computer-readable media according to the present technology enable wireless power transmitters (WPTs) to detect and characterize background signals and/or interfering noise to establish a blocker/interferer signal signature. This may be referred to herein as a background signature, and can be determined according to the present technology during such times that the wireless power transmitter is either or both of: not transmitting wireless power signals to receiver devices, and not receiving beacon or other signals from the receiver device(s) associated with the wireless power transmitter. The processes and methods according to present technology can be implemented as a continuous process. Alternatively, where a WPT and associated receiver device operate for signaling and wireless power transmission according to an expected or predetermined schedule, the processes described herein need not run at all times, but rather can be scheduled for only such times and durations sufficient to achieve the advantageous technical effects. In either case, the present technology provides a power-, memory-, and computation-efficient technique for both the WPT and the wireless power receiver devices (e.g., WPRs).

In some embodiments, an incoming radio frequency (RF) signal is continually processed by components of a WPT to cancel the blocker/interference signal and/or noise component(s) in it. The systems, methods and computer readable media described herein according to the present technology thereby facilitate detecting beacon and other signals specific for the operation of a WPT and associated WPR(s). The beacon signal may have a lower average power or amplitude as compared to the background signals or aggregate noise. The present technology may also enable undesirable effects of background signal or noise being potentially destructively interfering to operational signals like beacon signals to be eliminated or at least mitigated.

The present technology thus need not be utilized continually by either the WPT or the WPR since the WPT-WPR signaling itself need not be continuous during operation. Following the determination of the background signature, the present technology provides processes that facilitate effective and targeted wireless power delivery to WPRs associated with one or more WPTs such that potential undesired effects of background signals and/or noise are eliminated or at least mitigated.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software and/or firmware programs running on a computer, processor, or controller. Dedicated hardware implementations including, but not limited to, application specific integrated circuits, programmable logic arrays, system-on-chip (SoC), circuit logic, and other hardware devices can likewise be constructed to implement the circuits, functions, processes, and methods described herein. Methods and functions may be performed by modules or engines, both of which may include one or more physical components of a computing device (e.g., logic, circuits, processors, controllers, etc.) configured to perform a particular task or job, or may include instructions that, when executed, can cause a processor to perform a particular task or job, or may be any combination thereof. Further, the methods described herein may be implemented as a computer readable storage medium or memory device including instructions that, when executed, cause a processor to perform the methods.

Referring to FIG. 1, a block diagram of a wireless power delivery environment is shown and generally designated 100. The environment 100 can provide wireless power delivery from one or more wireless power transmission systems (WPTSs) 101a-101n (also referred to as "wireless power delivery systems" (WPTS), "antenna array systems", "wireless power transmitters" (WPT), and/or "wireless chargers") to various electronic devices, such as device 102a, 102b, or 102c within the wireless power delivery environment 100, that have one or more wireless power transfer circuits 103a, 103b, or 103c (also referred to herein as a "client", "wireless power receiver", and the plural variations thereof). The wireless power receivers 103 are configured to receive and process wireless power from one or more wireless power transmission systems 101a-101n. One or more of the electronic devices 102 may be embodied in rechargeable electronic devices having rechargeable energy storage devices like batteries and/or capacitors for their operation. In some embodiments, at least one of the electronic devices 102 is embodied in a portable electronic device.

As shown in the example of FIG. 1, the electronic devices 102a-102n may include devices such as mobile phones, television remote controls, or wireless game controllers. Further, the electronic devices 102a-102c can be any device or system that can receive power via a wireless power receiver (such as 103a, 103b, or 103c).

Each wireless power transmission system 101 can include multiple antennas 104a-104n (e.g., an antenna array including hundreds or thousands of antennas), which are capable of delivering wireless power to wireless devices 102a-102c. In some embodiments, the antennas are adaptively-phased RF antennas. The wireless power transmission system 101 is capable of determining the appropriate phases with which to deliver a coherent power transmission signal to the wireless power receivers 103a-103c. The array is configured to emit wireless power signals (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception, and transmission, such as radios, digital logic, and modems. In some embodiments, the WPTS 101 can have an embedded Wi-Fi hub for data communications via one or more antennas or transceivers.

As illustrated in the example of FIG. 1, WPTSs 101a-101n can each have multiple power delivery antennas, such as power delivery antennas 104a-104n in WPTS 101a. The power delivery antennas 104a can be configured to provide delivery of wireless RF power in the wireless power delivery environment 100. In some embodiments, one or more of the power delivery antennas 104a-104n can alternatively or additionally be configured for data communications in addition to or in lieu of wireless power delivery. The one or more data communication antennas can be configured to send data communications to and receive data communications from the wireless power receivers 103a-103c, the electronic devices 102a-102c, or a combination thereof. Such data communications may be implemented via any wireless data communication technology.

Each wireless power receiver 103a-103c can include one or more antennas (not shown) for receiving signals from the wireless power transmission systems 101a-101n. Likewise, each wireless power transmission system 101a-101n includes an antenna array having one or more antennas or sets of antennas capable of emitting continuous wave or discrete (pulse) signals at specific phases relative to each other. Each of the wireless power transmission systems 101a-101n is capable of determining the appropriate phases for delivering the coherent signals to the wireless power receivers 103a-103c. For example, in some embodiments, coherent signals can be determined by computing the complex conjugate of a received beacon (or calibration) signal at each antenna of the array such that the coherent signal is phased for delivering power to the particular wireless power receiver that transmitted the beacon (or calibration) signal.

Although not illustrated, each component of the environment, e.g., rechargeable electronic device, wireless power transmission system, etc., can include control and synchronization mechanisms, e.g., a data communication synchronization module. The WPTSs 101a-101n can be connected to a power source such as, for example, a power outlet or source connecting the wireless power transmission systems to a standard or primary AC power supply in a building.

Alternatively, or additionally, one or more of the WPTS 101a-101n can be powered by a battery or via other mechanisms, e.g., solar cells, etc.

The wireless power receivers 103a-103c and the WPTSs 101a-101n can be configured to operate in a multipath wireless power delivery environment 100. That is, the wireless power receivers 103a-103c and the WPTS 101a-101n can be configured to utilize one or more reflective objects 106 such as, for example, walls or other RF reflective obstructions within range to transmit beacon (or calibration) signals, receive wireless power, or receive data within the wireless power delivery environment 100. The reflective object(s) 106 can be utilized for multi-directional signal communication regardless of whether an object is blocking the line of sight between a WPTS 101 and the wireless power receivers 103.

As described herein, each electronic device 102a-102c can be any system, device, or any combination thereof that can establish a connection with at least one WPTS 101, another device, a server, or other systems within the wireless power delivery environment 100. In some embodiments, the electronic devices 102a-102c can include displays or other output functionalities to present data to a user, include input functionalities to receive data from the user, or both. By way of example, an electronic device 102 can be, but is not limited to, a video game controller, a server, a desktop computer, a computer cluster, a mobile computing device such as a notebook, a laptop computer, a handheld computer, a mobile phone, a smart phone, computer peripherals like a wireless mouse or wireless keyboard, an appliance, an alarm, a clock, a video doorbell, a toy, a surveillance or security system component, or similar. By way of example and not limitation, the electronic device 102 can also be any wearable electronic device such as a watch, necklace, ring, or other electronic device embedded on or within a customer. Other examples of an electronic device 102 include, but are not limited to, electronic shelf labels, safety sensors (e.g., fire or carbon monoxide), electric toothbrushes, electric shavers or hair clippers, electronic door locks and handles, electric light switch controllers, electric shavers, etc.

The WPTS 101 and the wireless power receivers 103a-103c can each include a data communication module for communication via a data channel. Alternatively, or additionally, the wireless power receivers 103a-103c can direct the electronic devices 102a-102c to communicate with the wireless power transmission system via a respective data communication module.

The wireless power receivers 103a-103c can implement a dual-band technique where a first band can be used as a dedicated retrodirective wireless power transfer (WPT) channel while a second band can be used as a communication channel. For example, a communication channel (node) can implement a low energy compatible communication type, such as Bluetooth Low Energy (BLE).

Wireless power delivery environment 100 may also include at least one other wireless power transmitter 108 and/or other devices emitting and/or receiving RF radiation 110 to and/or from sources other than WPTS(s) 101 and/or wireless power receiver(s) 103. As described in greater detail herein, wireless power transmitter(s) 108 and/or other devices that are temporarily or permanently situated in wireless power delivery environment 100 along with WPTS(s) 101 and wireless power receiver(s) 103 may emit, transmit and/or receive RF signals 110 other than the aforementioned wireless power signals, data communications, or beacon signals transmitted from wireless power receiver(s) 103 to WPTS(s) 101. For example, wireless power delivery environment 100 may include a first wireless power transmitter 108a that emits RF radiation 110 omnidirectionally, along with a second wireless power transmitter 108b that emits RF radiation 110 unidirectionally. In combination, RF signals from any of various sources (e.g., data communication and/or wireless power signals) in the wireless power delivery environment 100 may be referred to herein as a plurality of RF signals.

Although the aforementioned devices in the environment 100 may be designed to operate without substantial RF interference effects during operations when collocated with other RF devices, it may be desirable to operate WPTS(s) 101 and wireless power receiver(s) 103 such that any potential interference effects from devices like wireless power transmitter(s) 108 are eliminated, or at least reduced or mitigated. As will be appreciated by persons having ordinary skill in the art, the embodiments of the present technology described herein accomplish these, and other, advantageous technical effects in such multi-signal environment operational contexts of WPTSs 101.

Figure 2:
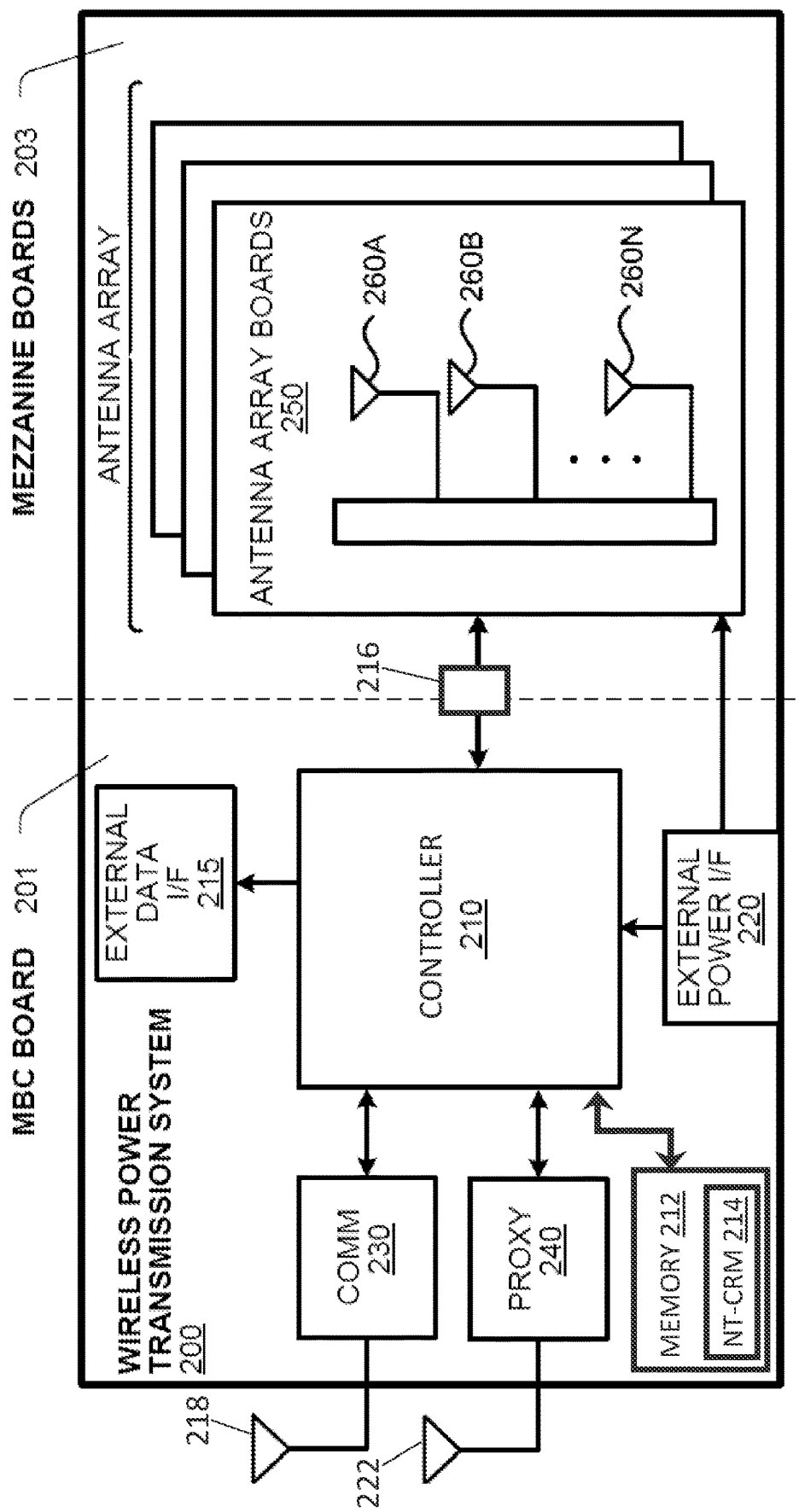
FIG. 2 is a block diagram of a wireless power transmission system, in accordance with certain embodiments of the present technology.

FIG. 2 depicts a block diagram of a wireless power transmission system 200, in accordance with certain embodiments of the present disclosure. In some implementations, wireless power transmission system 200 is embodied in the WPTS 101 shown and described above with reference to FIG. 1. The wireless power transmission system 200 may also be referred to herein as a wireless power delivery system or wireless power transmitter (WPT). The wireless power delivery system 200 can include one or more circuit boards, such as printed circuit boards (PCBs), which may include a master bus controller (MBC) board 201 and multiple mezzanine boards 203 that may include one or more antenna array boards 250. The MBC board 201 can include a control circuit 210 (also referred to in FIG. 2 as a "controller"), an external data interface (I/F) 215, an external power I/F 220, a communications I/F 230 and a proxy 240.

Wireless power transmission system 200 includes at least one RF antenna 260 operatively coupled to the MBC board 201 and one or more of its aforementioned components. In one embodiment, the mezzanine boards 203 (or antenna array boards 250) can each include multiple power transmission antennas 260A-260N. System 200 may include at least one antenna 218 operatively coupled to controller 210 by way of the communications interface 230. System 200 may also include at least one antenna 222 operatively coupled to controller 210 by way of the proxy 240. Some or all of the components of MBC board 201 or the mezzanine board(s) 203 can vary in quantity or be omitted in some embodiments; further, additional components can also be added. For example, in some embodiments only one of communication block 230 and proxy 240 may be included.

Wireless power transmission system 200 may include one or more filters 216, which may be embodied in analog and/or digital RF signal filters which may be at least in part under control of controller 210. In the example shown in FIG. 2, at least one filter 216 is operatively coupled to and between antenna(s) 260 and controller 210. In embodiments having a plurality of antennas 260, one filter 216 may be coupled to and between the controller 210 and each antenna 260 of the plurality of antennas 260. In another example, one filter 216 may be coupled to and between the controller 210 and each antenna array board 250 of the plurality of antenna array boards 250. Additionally, or instead, at least one filter 216 may be coupled to and between controller 210 and antenna(s) 218 of communications interface 230 and/or antenna(s) 222 of the proxy 240.

The controller 210 can be implemented via hardware circuits (e.g., application specific integrated circuits (ASICs), logic circuits, software, computer(s), microprocessor(s), microcontroller(s), field programmable gate array(s), or any combination thereof, and can be configured to provide control and intelligence to the components of the MBC board 201 as well as to the mezzanine board(s) 203. The controller 210 may include one or more processors, field programmable gate arrays (FPGAs), memory units, interface circuits, etc., and may direct and control the various data and power communications capabilities of the wireless power delivery system 200. The communications interface 230 can direct data communications on a data carrier frequency, such as a base clock signal for clock synchronization. Likewise, the proxy block 240 can communicate with clients via data communications as discussed herein. In certain embodiments, any of the data communications herein can be implemented via any short-range wireless technology, such as Bluetooth™, Wi-Fi™, ZigBee™, etc., including combinations or variations thereof. In further embodiments, the data communications can be implemented via a low-power communication protocol, low-bandwidth communication protocol, or a protocol providing both low-power and low-bandwidth.

In some embodiments, the controller 210 can also facilitate or otherwise enable data aggregation for devices, such as for Internet of Things (IoT) devices. In some embodiments, wireless power receivers (e.g., 103) can access, track, or otherwise obtain IoT information about the device in which the wireless power receiver is embedded and provide that IoT information to the wireless power transmission system 200 over a data connection. This IoT information can be provided to a data collection system (not shown), which may be local or server-based on an intranet (e.g., private network) or extranet (e.g., internet cloud-based), via the external data I/F 215, where the data can be aggregated, processed, or otherwise utilized. For example, the data collection system can process the data it receives to identify trends across various factors, such as geographies, wireless power transmission systems, environments, devices, etc. In some embodiments, the aggregated data or trend data determined from the aggregated data can be used to improve operation of the devices via remote updates or other updates. Alternatively, or additionally, in some embodiments, the aggregated data can be provided to third party data consumers. In a specific example, the wireless power transmission system can act as a gateway or enabler for IoT devices; the IoT information could include information regarding capabilities of the device in which the wireless power receiver is embedded, usage information of the device, power levels of the device, information obtained by the device or the wireless power receiver itself (e.g., via sensors, etc.), or any combination thereof.

The external power I/F 220 can be configured to receive external power and provide the power to various components of the wireless power delivery system 200. In some embodiments, the external power I/F 220 may be configured to receive an external direct current (DC) power supply. In other embodiments, the external power I/F 220 can receive alternating current (AC) power and convert it to DC power via an embedded AC/DC converter circuit. Alternative configurations are also possible based on the power requirements of the wireless power delivery system 200.

In operation, the MBC board 201 can control the wireless power transmission system 200 when it receives power from a power source and is activated. The MBC board 201 may then activate one or more of the power transmission antenna elements 260A-260N, where the activated power transmission antenna elements 260A-260N can enter a default discovery mode to identify available wireless power receivers (e.g., 103a, 103b, or 103c) within range of the wireless power transmission system 200. When a wireless power receiver 103 is found, the activated antenna elements 260A-260N can power on, enumerate, and (optionally) calibrate. The controller 210, another circuit within the MBC board 201, or a combination thereof may determine when an RF signal (e.g., beacon signal) is detected from a transmitter or transceiver of electronic device 102 (e.g., wireless power receiver 103 associated with electronic device 102). For example, a detection circuit or module of the MBC board 201 can detect a beacon signal transmitter from a wireless power receiver 103 embedded in or otherwise associated with the electronic device 102 at a predetermined time, frequency and/or phase. Such a beacon signal may prompt the wireless power delivery system 200 to initiate processes resulting in a wireless power signal being transmitted to the wireless power receiver 103 to facilitate charging an energy storage device (e.g., Li-ion or NiMH battery) of the electronic device 102, such as discussed below.

The MBC board 201 can generate a discovery signal via at least one antenna 260 of the antenna array boards 250. Alternatively, or additionally, the discovery signal may be transmitted using at least one antenna 218 operatively coupled to the controller 210 by way of the communications interface 230. The discovery signal may also be referred to as an activation signal or interrogation signal. In some embodiments, the discovery signal can be a pulse train modulated signal or a low-level interrogation signal. Generally, the discovery signal questions (or interrogates) the space (e.g., environment 100) for wireless power receivers 103, and a receiver 103 within the space may answer (or reply) via a beacon signal, for example.

The WPT system 200 can monitor one or more antennas, such as the antennas 260A-260N or a dedicated antenna, to detect an RF beacon signal transmitted by the wireless power receiver 103. Alternatively, or additionally, antenna(s) 218 may be utilized for detection of the aforementioned RF beacon signal. Once such a beacon signal is received from a wireless power receiver 103, the controller 210 can determine if the received signal includes a data communication component, a beacon component, or both. When a data communication component is present, the controller 210 may decode the communication portion of the signal and process the data. In some examples, the data provided by the communication portion of the signal may be system level monitoring data (e.g., energy storage level, etc.) or may be data related to the purpose or function of the electronic device 102 having, or otherwise associated with, the wireless power receiver 103 (e.g., sensor data or data about an IoT device).

The controller 210 may determine a range and location of a client device (e.g., electronic device 102 having WPR 103), such as by performing phase data extraction from the beacon component. For example, the WPT 200 may implement a phase-based determination system such as described in U.S. Pat. No. 10,396,602 or U.S. Pat. No. 10,447,092, which are incorporated by reference herein in their entireties. Based on the range and location of the client, the controller 210 can establish and commence wireless power delivery to the wireless power receiver 103 via a dedicated, retrodirective linkage channel using one or more of the antennas 260A-260N. In some embodiments, a proxy antenna element 240 (e.g., antenna(s) 222) can broadcast the discovery signal to wireless power receiver(s) 103 within a certain range. As discussed herein, the discovery signal can indicate to a wireless power receiver 103 that wireless power delivery is available.

Wireless power transmission system 200 may include at least one memory storage device 212 (referred to more succinctly as "memory") operatively coupled to the controller 210. Memory 212 may be further coupled to the external data I/F 215 or to other means for a user of system 200 to load or otherwise provide or access data to and/or from memory 212. In some embodiments, memory 212 includes one or more non-transitory computer-readable media (NT-CRM) 214 capable of storing program instructions to facilitate, at least in part, performance of the various method and process steps described herein according to the present technology. Such method and process steps may be performed, implemented, executed, or otherwise facilitated, at least in part, by controller 210. NT-CRM 214 may be embodied in, for example and without limitation, ROM, EEPROM and/or Flash-type memory.

Figure 3:
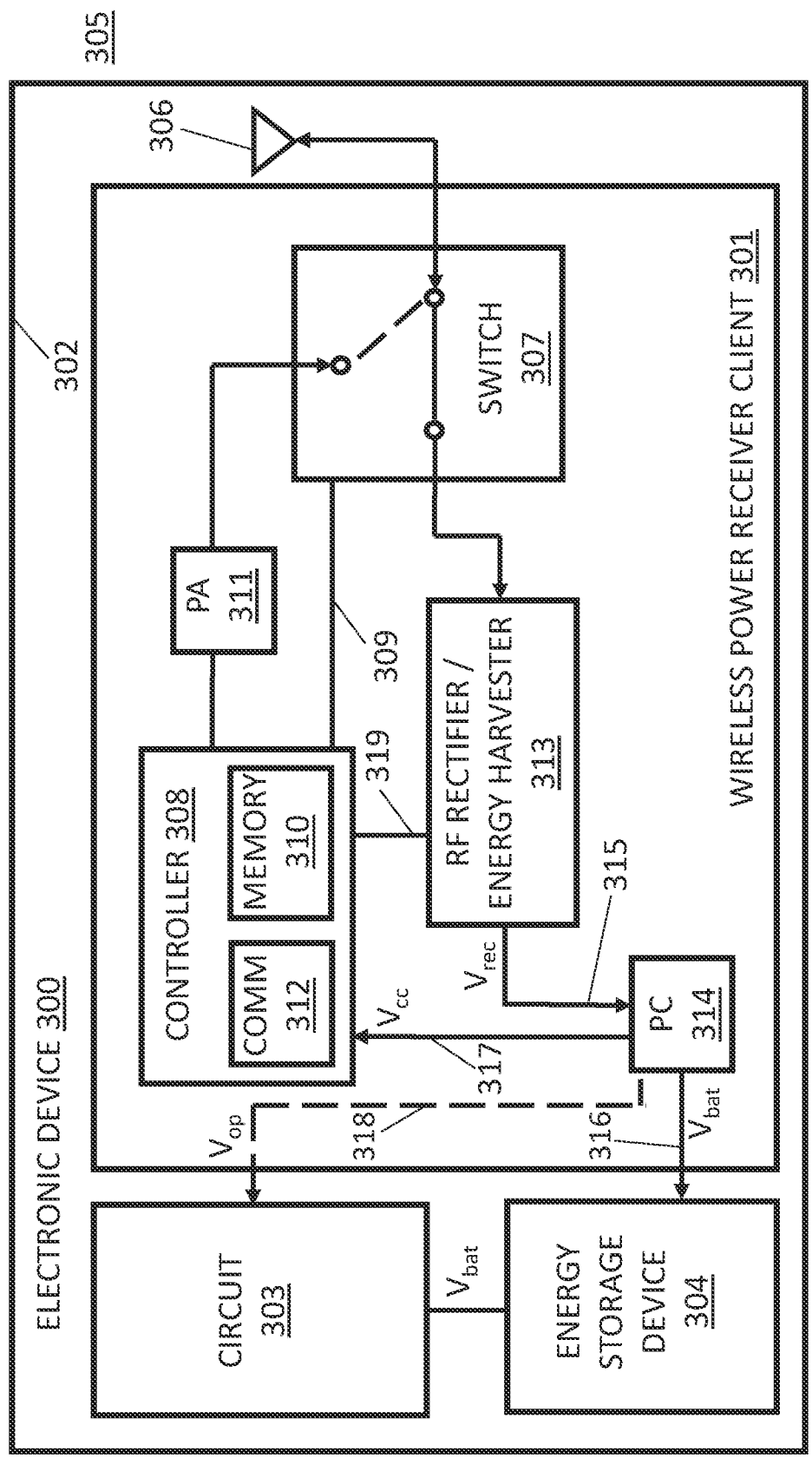
FIG. 3 is a block diagram of an electronic device with associated wireless power receiver client, in accordance with certain embodiments of the present technology.

FIG. 3 depicts a block diagram of an electronic device 300 having an associated wireless power receiver (WPR) client 301, in accordance with some embodiments of the present technology. In some examples, the electronic device 300 may be embodied in electronic device 102 as shown and described above with reference to FIG. 1. In some examples, wireless power receiver client 301 may be embodied in wireless power receiver 103 as shown and described above with reference to FIG. 1. Wireless power receiver client 301, standing alone or as associated with electronic device 300, may be more succinctly referred to herein as a "wireless power receiver" (WPR) or "client device." Various electrical and mechanical components of the wireless power receiver client 301 may be at least partially positioned inside of an interior cavity defined by a housing 302.

A circuit 303 and/or other electronic components of the electronic device 300 may provide for and otherwise facilitate the provision of functions for the benefit of users of device 300. For example, and without limitation, where electronic device 300 is embodied in an electric toothbrush, circuit 303 may include at least one switch and a motor controller, and circuit 303 may be operatively coupled to an electric motor to provide a torque to move a brush head of the electric toothbrush. As another example, where electronic device 300 is embodied in a wireless audio speaker, circuit 303 may include at least one switch and a speaker driver, and circuit 303 may be operatively coupled to a speaker to direct movements of mechanical parts of speaker by electromagnetic forces to produce audible sounds like music. A person having ordinary skill in the art is expected to envision a variety of known, or as yet unknown, electronic devices 300 which may benefit from the system and methods described herein according to the present technology.

Electronic device 300 may include an energy storage device 304, which may be at least partly positioned inside of the housing 303. Energy storage device 304 may be embodied in a rechargeable battery including, for example and without limitation, a Li-ion or an NiMH battery cell. Energy storage device 304 may be electrically coupled, or couplable to, the circuit 303 of electronic device 300 to provide a voltage ($V_{bat}$, e.g., 3.7-4.2V for a Li-ion battery cell) for use in operating circuit 303. Circuit 303 may include one or more components (not shown in FIG. 3) to convert and/or condition $V_{bat}$ to another voltage for use in operating circuit 303 or other aspects of device 300.

Wireless power receiver client 301 may include components, parts and associated functions for use as a wireless transceiver for use in receiving wireless power signals and/or data communications signals from, for example, WPTS 200, and for transmitting signals (e.g., RF beacon and/or data signals) to WPTS 200. At least a portion of the wireless power receiver client 301 may be formed as a printed circuit board (PCB). At least a portion of the PCB may be formed of a flexible material to facilitate conformance and fit into, for example, housing 302. As such, wireless power receiver client 301 may be well suited for either retrofitting into existing electronic devices 300 or for integrating into new designs. Accordingly, the present technology may enable most any rechargeable electronic device 300 to advantageously utilize wireless charging, even in wireless power delivery environments 305 where noise or other interfering signals or effects may exist.

Wireless power receiver (WPR) client 301 may include, or be coupled, or couplable, to at least one antenna 306. The antenna 306 may be a dual-band antenna or may include more than one antenna. In some embodiments, WPR client 301 may include a single antenna 306 (e.g., a dual-band antenna) that provides data transmission functionality as well as wireless power and data reception functionality.

Antenna 306 may be coupled, or couplable, to a switch 307. Switch may be operably coupled to a controller 308 through two lines, as shown in FIG. 3. A state of switch 307 may be controlled by controller 308 by a switch control signal transmitted on a control line 309. Controller 308 may be embodied in one or more of the types of components as described above with reference to FIG. 2 for the controller 210 of WPTS 200. Such components of controller 308 (and likewise for controller 210) may be referred to herein more generally as "logic circuitry." In embodiments where controller 308 is or includes a computer, processor, microcontroller, and the like, controller 308 may include or be coupled, or couplable, to a memory storage device 310 (also referred to herein as memory 310). Memory 310 may include one or more non-transitory computer readable media (e.g., ROM, EEPROM and/or Flash-type) to store as, for example, firmware or software, program instructions executable by controller 308 for implementing, or otherwise enabling or facilitating, the processes and methods described herein according to the present technology.

The switch 307 in a first state (denoted by dashed line in FIG. 3) couples antenna 306 to a power amplifier (PA) 311 that may in turn be operably coupled to the controller 308. Controller 308 may include (or may be associated with, or coupled to) a communications interface 312. The communications interface 312 may include analog and/or digital circuitry under control of controller 308 to generate an RF signal (e.g., RF beacon signal) for transmission using antenna 306 to the wireless power delivery environment 305 which may contain at least one WPTS 200. The PA 311 may amplify this RF signal to facilitate its transmission to environment 305, and thus also its receipt by WPTS 200.

The switch 307 in a second state (denoted by a solid line in FIG. 3) couples antenna 306 to a means (e.g., an RF rectifier/energy harvester 313) for inducing a voltage in response to the wireless power signal being received via antenna(s) 306. With the switch 307 in the second state, WPR client 301 may utilize antenna(s) 306 to receive a wireless power signal transmitted by WPTS 200 into environment 305. The wireless power signal may pass from antenna 306 to the RF rectifier/energy harvester 313, which induces a voltage ($V_{rec}$) in response to the wireless power signal being received from WPTS 200.

In some embodiments, the controller 308 and/or the communications interface 312 can communicate with or otherwise derive device information (e.g., IoT information, client ID, or a power urgency indicator) from the electronic device 300 in which WPR client 301 is embedded or otherwise associated with. Although not shown, in some embodiments, the WPR client 301 can have one or more wired or wireless data connections (not shown in FIG. 3) with the electronic device 300 over which device 300 information can be obtained by the controller 308. Alternatively, or additionally, device 300 information can be determined or inferred by the controller 308 and/or other components of WPR client 301; for example, via one or more sensors (not shown in FIG. 3). The device 300 information can include, but is not limited to, information about the capabilities of the device 300 with which the WPR client 301 is associated, usage information of the device 300, power levels of the energy storage device(s) 304 of the device 300, information obtained or inferred by the device 300, or any combination thereof.

In some embodiments, a client identification (ID) module (not shown) can store a client ID that can uniquely identify the WPR client 301 in the wireless power delivery environment 305. For example, the client ID can be transmitted to one or more WPTSs 200 when communication is established. In some embodiments, the WPR client 301 may be able to receive and identify one or more other WPR clients 301 in the wireless power delivery environment 305 based on respective client IDs. Data representative of the client ID may be stored in memory 310 for use by the controller 308 and/or the communication module 312.

WPR client 301 may include a power converter (PC) 314 (e.g., buck/boost) coupled to and between the RF rectifier/energy harvester 313 and the energy storage device 304. When a wireless power signal is being received by the RF rectifier/energy harvester 313 of the WPR client 301 via antenna(s) 306, a DC current 315 may be transmitted to PC 314. The PC 314 may contain circuitry to convert and/or condition the DC current 315 to, for example a DC current 316 at $V_{bat}$ to charge the energy storage device 304. In some embodiments, the PC 314 may convert and/or condition the DC current 315 to another DC current 317 at $V_{CC}$ to power controller 308 and/or other components of WPR client 301. In other embodiments, the PC 314 may convert and/or condition the DC current 315 to another DC current 318 at $V_{OP}$ to operate circuit 303 and/or other components of electronic device 300. In an example, not shown in FIG. 3, components and functions of PC 314 may be included in the RF rectifier/energy harvester 313. In some implementations, functionality (e.g., sense/measure voltages or currents, adjust parameters such as a switching frequency, etc.) of RF rectifier/energy harvester 313 and/or PC 317 may be at least partially under the control of controller 308 by way of at least one control signal line 319.

Figure 4A:
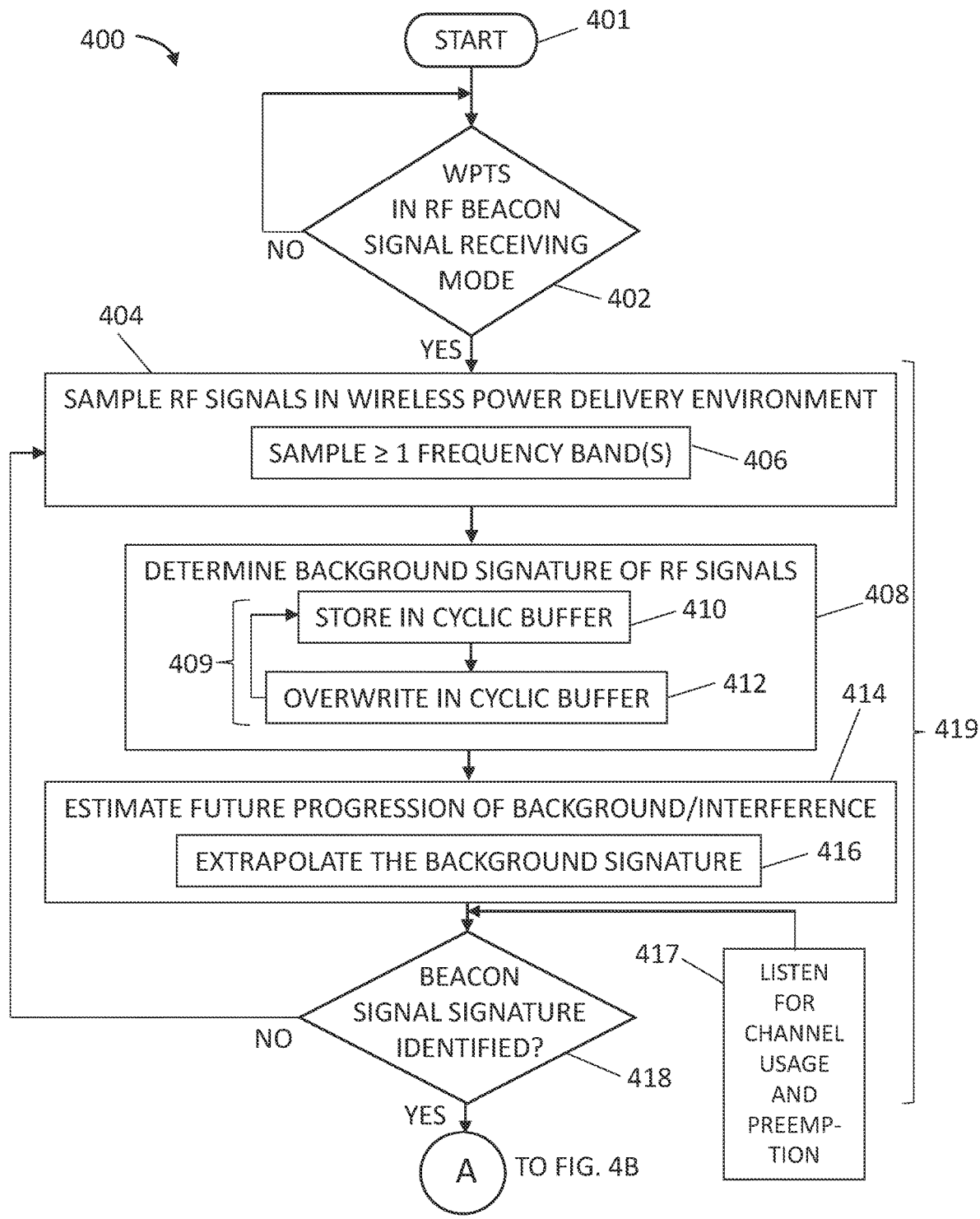
FIGS. 4A and 4B are flowcharts of a method for operating a wireless power transmitter, in accordance with certain embodiments of the present technology.
Figure 4B:
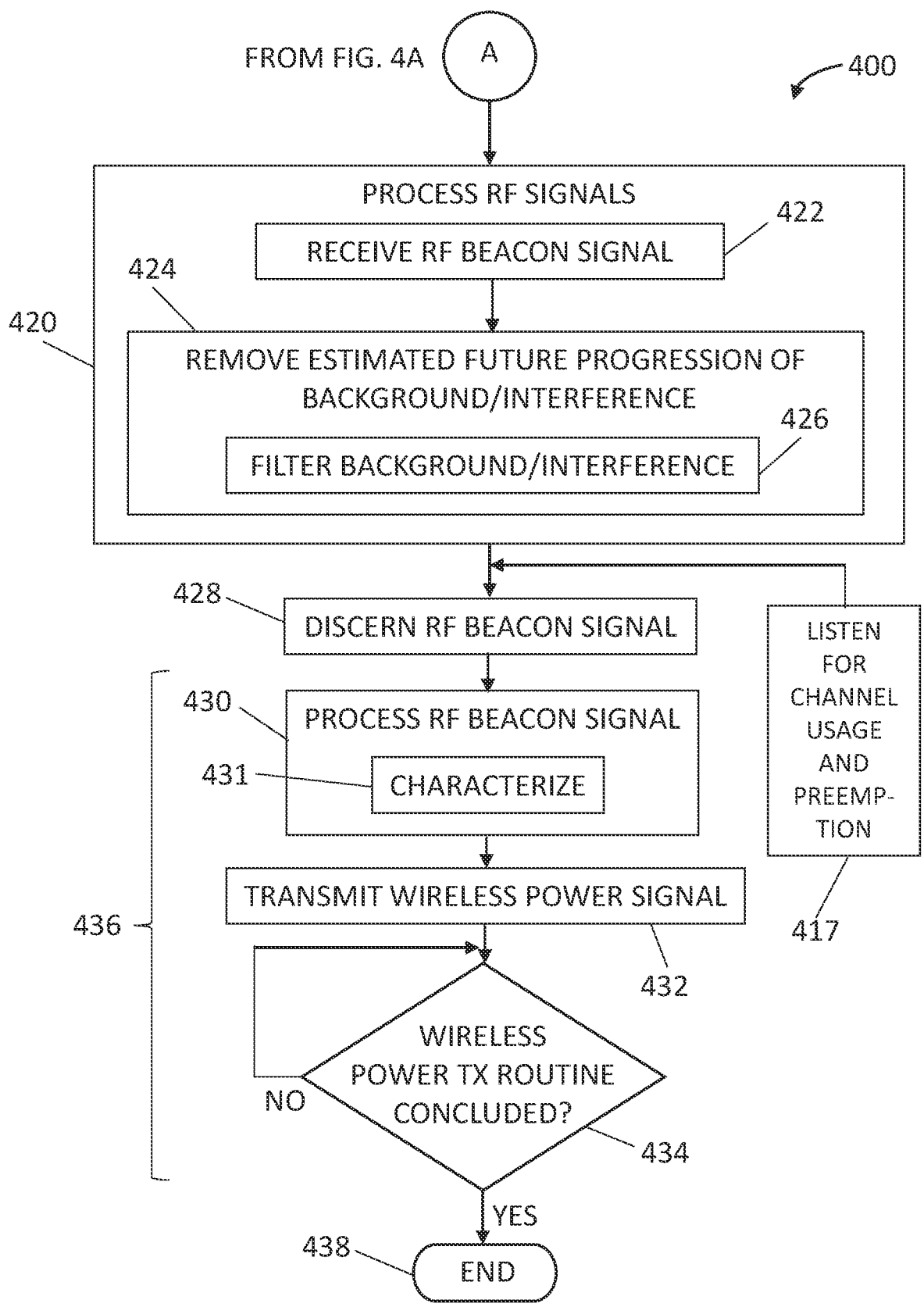

FIGS. 4A and 4B provide a flowchart of a method 400 of operating a wireless power transmitter (WPT) system (e.g., WPTS 200), in accordance with certain embodiments of the present technology. Method 400 may be implemented by the WPTS 200, the WPRs or WPR clients 301 (WPRs 301, for short), and the various components thereof, as described herein. Method 400 may commence from a start state 401. The start state 401 may represent WPTS 200 and its controller 210 being powered on and initialized for use as described herein. From the start state 401, method 400 may proceed to a first logical branch 402. In the first logical branch 402, controller 210 may check whether WPTS 200 is in an RF beacon signal receiving mode. In some embodiments, the controller 210 may receive a signal from one or more WPRs 301 situated in the environment 305, where such signals may encode data representative of an instruction to the controller 210 to initiate a process to cause the WPTS 200 to enter the RF beacon signal receiving mode.

If, at first logical branch 402, controller 210 determines that WPTS 200 is not in the RF beacon signal receiving mode, method 400 may loop back to the start state 401 and reenter first logical branch 402. On the other hand, where controller 210 determines the WPTS 200 is in the RF beacon signal receiving mode, method 400 proceeds to a first operation, or step, of a process, as shown in FIGS. 4A and 4B. In some embodiments, this process may be a continuously running service, or process. As will be understood, some embodiments of a continuous process of method 400 as depicted in FIGS. 4A and 4B represents a moving time window. In other embodiments, implementation of a moving window stored in a cyclic buffer may not feasible or practical. In such cases, successive time-windows maintained in fixed-length buffers may be processed separately, as in "multi buffering" or ping-pong buffering methods, which in some embodiments may be referred to as double/triple/ . . . /n-uple buffering.

In method 400, controller 210 may utilize a continuously running digital signal processing engine to predict the "background" into the future. Accordingly, each step of method 400 may have available the most recent representation (e.g., the last 5 seconds) of the background present in the wireless power delivery environment 305. Method 400 may include a sampling 404 step. In the sampling 404 step, a plurality of RF signals in the wireless power delivery environment 305 may be sampled by the controller 210 via the at least one antenna (e.g., one or more of antennas 260, 218 and 222). In one embodiment, the sampling 404 step of method 400 may include sampling 406 one or more frequency bands of the plurality of RF signals. The frequency bands sampled 406 may include at least one band of signals centered around the operation band determined by the reception frequency bandwidth of WPTS 200 (e.g., for RF beacon signals transmitted by WPR(s) 301). The plurality of RF signals may be, or include, a continuous wave RF signal. In one example, the sampling 404 may be accomplished in the time domain. In another example, the sampling 404 may be accomplished in the frequency domain. In yet another example, the sampling 404 may be accomplished partially in the time domain and partially in the frequency domain.

The method 400 may also include a determining 408 step. The determining 408 step may be performed in method 400 either after, or at least partially concurrently with, performance of the sampling 404 step. In the determining 408 step, a background signature of the plurality of RF signals may be determined by the controller 210 based on the sampled 404 RF signals. In some embodiments, the sampling 404 and determining 408 steps may be performed continuously or at least semi-continuously such that the background signature for the RF signals in the wireless power delivery environment 305 may be known to the controller 210 at any given moment in time for purposes of performance of method 400 according to embodiments of the present technology. The background signature so determined 408 may have a lower average signal power as compared to the plurality of RF signals.

Notably, the background signature that is determined 408 in method 400 according to some embodiments of the present technology may include non-random noise and part of the background and interfering signals thereof. However, characterization of such "noise" in the sense of totally random (e.g., thermal) noise—for which prediction of into the future may not be possible—is not the intended outcome of the determining 408 step. Rather, method 400 may include in its characterization of RF signals and determination 408 of the background signature some kinds of interferers that can be treated as "noise". As such, method 400 may be geared to characterizing and advantageously utilizing the signal background, including background interference or background by other intentional RF sources other than the WPT-WPR pair of interest.

In one example, a buffer is maintained in a memory storage device (e.g., memory 212 or a cache local to controller 210), whereby the determined 408 background signature may be stored and overwritten as time moves on. In an example, the buffer is or includes a circular, or cyclic, buffer, which may operate according to the first-in-first-out (FIFO) principle. Accordingly, in some embodiments, the determining 408 step of method 400 may include a subroutine 409 that may include the steps of storing 410 the determined 408 background signature for consecutive time windows (e.g., 5 seconds) and overwriting 412 the cyclic buffer with a next determined 408 background signature. In an example, subroutine 409 may operate as a loop. In some embodiments, the cyclic buffer utilized for the storing 410 and overwriting 412 steps may operate on the FIFO principal. In some embodiments, the cyclic buffer used in the determining 408 step of method 400 may have the following two functions: 1) take a nonrandom part of the background/ interference of the sampled 404 RF signals and utilize that to project into future so as to know what to extrapolate; and 2) look for an RF beacon signature. By the steps of method 400 as described herein, this may provide a "signal memory" for additional signal processing for a predetermined time (e.g., 2 milliseconds (ms)) and every time will have a moving window (e.g., 5 seconds) with a constant duration.

The aforementioned subroutine 409 for the determining 408 step may be implemented using a single, fixed size cyclic buffer requiring comparatively lower memory, power and computational resources as compared to at least some known background signal characterization techniques. Furthermore, method 400 accounts for possible specifications of a WPTS 200 whereby it is not designed to receive all possible frequency bands that may be present in the background/interference of environment 305. Hence, selecting those frequency band(s) corresponding to frequency(ies) centered around the operation band determined by the reception frequency bandwidth of WPTS 200 (e.g., for RF beacon signals transmitted by WPR(s) 301) may provide additional operational efficiencies. The WPTS's 200 reception band may be wider than the frequency needed for receipt of an RF beacon signal from WPR 301, so the frequency band of interest to collect the data to determine 408 the background signature may not need to be so wide to collect and process RF signal background and/or signals outside the band of interest.

For each of the aforementioned moving time windows for the determining 408 step, method 400 may include estimating 414 a future progression of time-domain signal(s) of the background/interference of the sampled 404 RF signals in the at least one band of signals. In some embodiments, power(s), amplitude(s), frequency(ies) and/or phase(s) of such signals may be estimated 414 for this aspect of method 400. In some embodiments, the estimating 414 step may include extrapolating 416 the determined 408 background signature. In the extrapolating 416 step, the determined 408 background signature may be projected by the controller 210 into the future by a predetermined period of time (e.g., 4 milliseconds) from the instant in time that the future progression of the background/interference is estimated 414. In one example, the extrapolating 416 step may include averaging at least part of the background/interference components of the determined 408 background signature in the frequency band(s) of interest. In another example, the extrapolating 416 may be, or may include, an envelope extrapolation including fitting of a mathematical polynomial to the signal or signal characteristics in the cyclic buffer as a function of time. In yet another example, the extrapolating 416 may make use of machine learning (ML) whereby, for example and without limitation, historical background signatures and/or signal characteristics of the background/ interference present in environment 305 may be used, along with training and/or development of an ML algorithm, to facilitate one or more of the extrapolating 416 and/or estimating 414 steps of method 400.

In some embodiments, at least a portion of the background/interference present in the wireless power delivery environment 305 may be expected and/or known. For example, where environment 305 includes one or more wireless Internet routers, WiFi access point SSID(s) may be detected by controller 210 and simply removed automatically from the background/interference for purposes of at least one of the sampling 404, determining 408 and estimating 414 step(s). Approaches such as these that make use of known and/or expected nonrandom background/interference signals may further simplify method 400 and provide further efficiencies in terms of memory/computing resources and power consumption.

In other embodiments, a signal processing scheme instead of, or in addition to, the extrapolating 416 and/or estimating 414 steps may be employed in method 400. For example, and without limitation, at least one of the determining 408, estimating 414, removing 424, and filtering 426 steps of the method 400 according to the present technology may include listening 417 for signals in the wireless power delivery environment 305 having characteristics corresponding to other standards such as WiFi and Bluetooth packages/packets. In one example, the listening 417 step of method 400 may include estimating the arrival time(s) and/or channel utilization of such signals or portions thereof to facilitate filtering them out. In another example, the listening 417 step of method 400 may include time-windowing the arrived signal, as in cases where channel(s) for standard signals like WiFi and Bluetooth are not active.

From the estimating 414 step, method 400 proceeds to a second logical branch 418, whereby the controller 210 determines whether or not a signature of an RF beacon signal has been identified. In some embodiments, the second logical branch 418 may be a part of a continuously operated subprocess 419 of method 400 including the sampling 404, determining 408 and estimating 414 steps. If, in the second logical branch 418, the signature of the RF beacon signal is not identified by controller 210, then method 400 loops back to the sampling 404 step. In an example, having looped back to the sampling 404 step, the aforementioned subprocess 419 is again performed in method 400, as described above. On the other hand, where controller 210 does identify the RF beacon signal signature in the second logical branch 418, method 400 proceeds to a next operation, or step, as shown in FIG. 4B, continued from FIG. 4A, as denoted by the circled "A."

The next step in method 400 upon controller 210 identifying, in the second logical branch 418, the signature of the RF beacon signal, may be processing 420 the overall RF signals for the aforementioned frequency bands of interest received for the corresponded projected time period in which the remainder of the RF beacon signal is expected to be received 422 from a WPR 301. In some embodiments, subprocess 419 ceases to operate in method 400 upon, or sometime before, the commencement of the processing 420 step. The processing 420 may include receiving 422 the RF beacon signal and removing 424 the estimated 414 future progression of background/interference.

In the receiving 422 step of method 400, the RF beacon signal may be received via the at least one antenna (e.g., 260, 218 and 222) from one or more WPRs 301. A result of the processing 420 step may include a reduction in the average power of the plurality of RF signals, where the background signature filtered from the RF signals yields a background/interference that, although it may be ever present in the wireless power delivery environment 305, does not, after being processed 420, pose a significant problem with operating the WPTS 200 to provide targeted transmission of wireless power signals to WPR(s) 301 situated in the environment 305.

The processing 420 step of method 400 may thus advantageously facilitate detection in the wireless power delivery environment 305 of the RF beacon signal that is distinct from the plurality of RF signals. This beneficial technical effect of the present technology may be accomplished even in such cases where the plurality of RF signals includes the RF beacon signal. In one example, the presence of the RF beacon signal may be subsumed into the background/interference characterized in the determining 408, estimating 414 and/or processing 420 steps, yet still discerned 428 by WPTS 200 in method 400.

In some embodiments, the controller 210 may process 420 the plurality of RF signals using digital and/or analog signal processing techniques and components. In some embodiments, the processing 420 step of method 400 may be accomplished, at least in part, by processing 420 of the background signature, either alone, or in combination with the plurality of RF signals. For example, removing 424 the estimated 414 future progression of the background/interference may include filtering 426 the extrapolated background/interference from the signal(s) received during the time window following when the signature (e.g., encoded and/or encrypted preamble) of the RF beacon signal is identified by controller 210 in the second logical branch 418. The filtering 426 may utilize, for example and without limitation, filter(s) 216 described above with reference to FIG. 2.

The signature of the RF beacon signal transmitted by a particular WPR 301 may be encoded and/or encrypted, and may also include one or more signal components having an amplitude expected to exceed that of the background/interference so as to facilitate controller 210 being able to identify them in the second logical branch 418. The RF beacon signal signature may thus uniquely identify a particular WPR 301 in the wireless power delivery environment 305. In cases where a plurality of WPRs 301 including the aforementioned particular WPR 301 transmit RF beacon signals in environment 305, at least a portion of the RF beacon signals other than the encoded and/or encrypted preamble providing the signature may be substantially the same. WPRs 301 associated with a particular WPTS 200 may be configured to generate and transmit respective RF beacon signals into the environment 305 with preambles having sufficient characteristics for controller 210 to distinguish between WPRs 301 and to facilitate operation of method 400 according to the present technology.

Signal processing by the controller 210 for the determining 408, estimating 414 and/or processing 420 step(s), for example, may characterize the particular frequency bands/channels of the plurality of RF signals sampled 404 in the time and/or frequency domain(s) into, for example and without limitation, a background signature of signals and/or noise as received by antenna(s) of WPTS 200, where such signals and/or non-random noise are impertinent to wireless power transfer operations as between WPTS 200 and associated WPR(s) 301. Such characterization may be facilitated by the above-described determining 408, estimating 414 and/or processing step 420 step(s) of method 400, where the at least one band of signals centered around the aforementioned operation band of the WPTS 200 is the focus since the background of signals of interest for determining 408 the background signature may be expected to occupy such band(s), rather than a discrete frequency. Accordingly, the present technology utilizes an efficient scheme that focuses on the signals and time periods of interest so as to reduce power and computing resource consumption.

After the discerning 428 step, method 400 proceeds to processing 430 the RF beacon signal. In some embodiments, the processing 430 step may include characterizing 431, by the controller 210 and based on data encoded in at least a portion of the preamble, or signature, of the RF beacon signal, characteristics of a particular WPR 301. Such characteristics may include, for example and without limitation, an identifier of the WPR 301, whether or not the WPR 301 is authorized to receive wireless power signals for an associated with WPTS 200, a level of need or priority for wireless power delivery of the WPR 301, and the like. In some embodiments, processing 430 the RF beacon signal includes determining, e.g., as part of the characterizing 431, characteristics of the RF beacon signal in order to locate a three-dimensional position of the respective WPR 301 in the wireless power delivery environment 305 relative to a position of the WPTS 200. In one example, one or more inherent and/or controller 210 determined characteristics of the RF beacon signal may be used by controller 210 to determine e.g., as part of the characterizing 431, whether or not a particular WPR 301 is in motion.

Based at least in part on the processing 430, the WPTS 200 may transmit 432 one or more wireless power signals to the WPR 301 that transmitted the RF beacon signal received 422 by WPTS 200. The transmitting 432 step may include the controller 210 directing, in response to receiving 422 the beacon signal(s) from the WPR(s) 301 situated in environment 305, the at least one antenna (e.g., one or more of antennas 260) to transmit the wireless power signal(s) into the wireless power delivery environment 305 for targeted receipt by at least one WPR 301. In one example, the transmitted 432 wireless power signal(s) may include continuous wave RF signal(s). In another example, the transmitted 432 wireless power signal(s) may include pulsed RF signal(s).

Method 400 may then proceed to a third logical branch 434, whereby controller 210 determines whether or not a wireless power transmission subprocess 436 including the processing 430 and transmitting 432 steps has concluded. The determination made by controller 210 in the third logical branch 434 may include processes such as monitoring a timer and/or monitoring signal(s) received from the WPR 301 during the transmitting 432 step of method 400, where such processes may provide further determinations as to whether the WPR 301 or an energy storage device thereof has received a sufficient amount of power by the transmitting 432 step.

In one embodiment, the wireless power signal(s) may be transmitted 432 using the antenna(s) 260 for a duration sufficient to enable the controller 210, antenna(s) 260 and/or additional components of WPTS 200 to generate and transmit the wireless power signal(s) to one or more of the WPRs 310. For example, controller 210 may compute characteristics such as timing, frequency and phase such that wireless power signal(s) are generated and transmitted via antenna(s) 260 to be retrodirective to a respectively received RF beacon signal. Such computations may also include which antenna(s) 260 of the plurality of antennas 260 for controller 210 to direct to transmit the wireless power signal(s).

In some embodiments, for the transmitting 432 step, the controller 210 may direct a first subset of at least one of a plurality of antennas 260 to transmit a first wireless power signal to a first WPR 301, while also directing at least a second subset of the plurality of antennas 260 to transmit at least a second wireless power signal to at least a second WPR 301. As such, the present technology may enable a single WPTS 200 to implement method 400 in parallel for mediating the transmission 432 of wireless power signals to two or more WPRs 301.

Following performance of the transmitting 432 step and controller determining in the third logical branch 434 that subprocess 436 has concluded, method 400 may proceed to an end state 438. In some embodiments, the end state 438 directs the method 400 to proceed back to the start state 401. In other embodiments, entering the end state 438 in method 400 includes method 400 looping back to the first logical branch 402.

Figure 5:
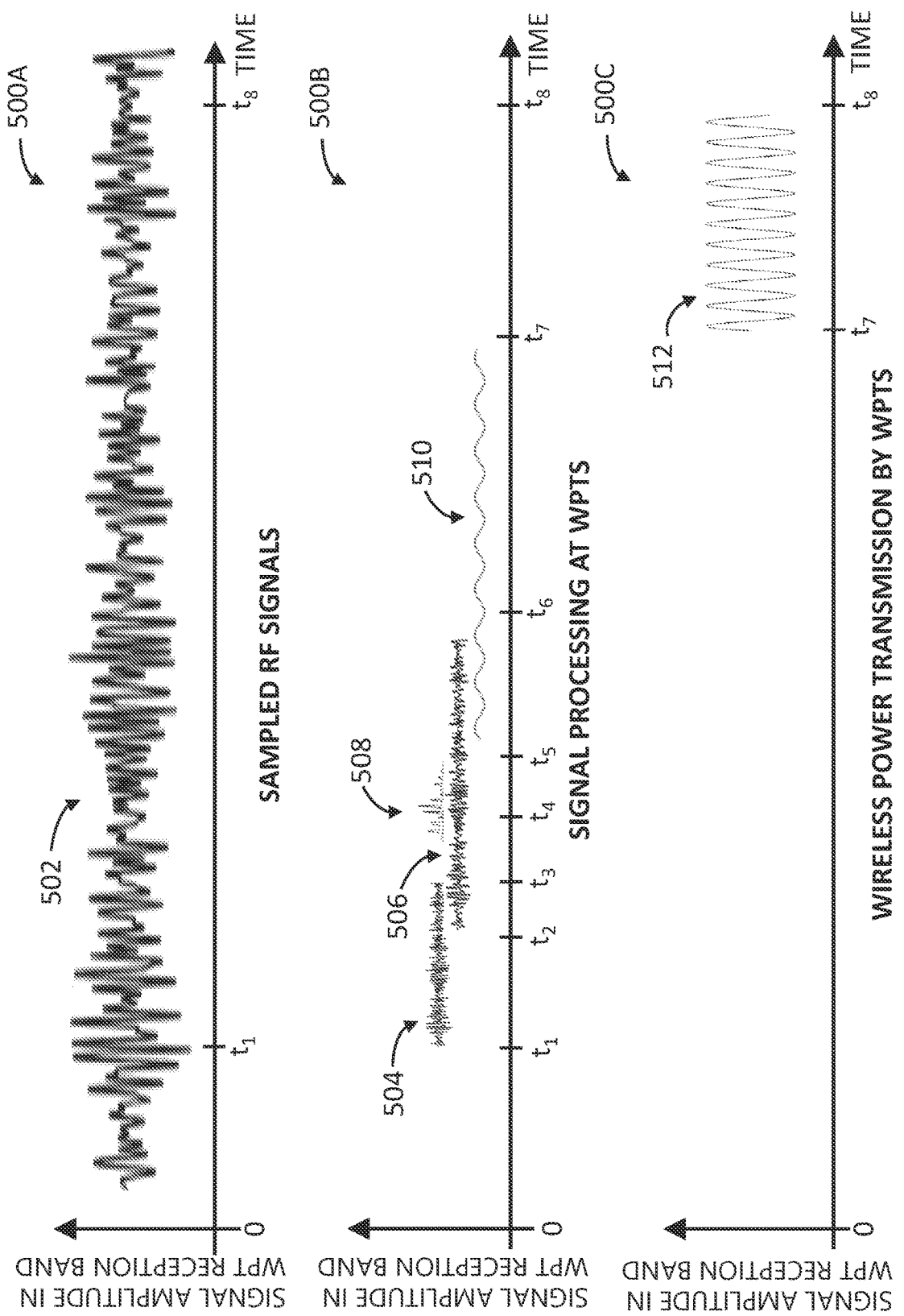
FIG. 5 is a schematic representation of steps of the method shown in FIGS. 4A and 4B, in accordance with certain embodiments of the present technology.

FIG. 5 provides schematic representations by way of panels 500A, 500B and 500C of processes implemented by the method 400 shown in FIGS. 4A and 4B, in accordance with certain embodiments of the present technology. In FIG. 5, representations of various signals are not intended to depict actual characteristics (e.g., frequencies, waveforms, etc.) of any of the referenced signals. With further reference to FIGS. 4A and 4B, in some embodiments, at time 0, controller 210 may determine (e.g., in first logical branch 402) that the WPT 200 is in the RF beacon signal receiving mode. Controller 210 may then commence sampling 404 RF signals 502 in the wireless power delivery environment 305 in the frequency band of interest, where the sampled 404 RF signals 502 may include background/interference, as described above with reference to the sampling 406 step of method 400. In the example shown in FIG. 5, those RF signals 502 may be ever present in environment 305, as shown in panel 500A.

Referring now to panel 500B, based on the sampling 404, the background signature may be determined 408 and may be used to estimate 414 a first instance of the future progression 504 (e.g., $t_1$ to $t_3$) of the background signature. In the example, given that a signature of the RF beacon signal is not identified by controller 210 via the second logical branch 418 of subprocess 419, a second instance of the future progression 506 (e.g., $t_2$ to $t_6$) may be estimated by controller 210 using, at least in part, subprocess 419 according to the present technology. As time goes on, at, e.g., $t_4$, controller 210 may identify (e.g., in first logical branch 418) a signature 508 of an RF beacon signal. Method 400 may thus proceed to the processing 420 step, whereby the RF beacon signal 510 (e.g., a main sequence thereof) may be received 422 (e.g., at $t_5$) and the estimated 414 future progression 506 may be removed 424 at $t_6$. Performance of the processing 420 step in method 400 may thus enable the RF beacon signal 510 to be discerned 428 and processed 430, e.g., from $t_6$ to $t_7$.

Referring now to panel 500C, and further to subprocess 436 of method 400, data from the controller 210 processed 430 RF beacon signal 510 may form the basis for transmitting 432 a wireless power signal 512 into the wireless power delivery environment 305 (e.g., from, e.g., from $t_7$ to $t_8$). When controller 210 identifies (e.g., in the third logical branch 434) that the wireless power transmission subprocess 436 implemented by WPT 200 is concluded, controller 210 may return to the first logical branch 402, or alternatively enter the end state 438, in method 400, as the case may be.

Figure 6:
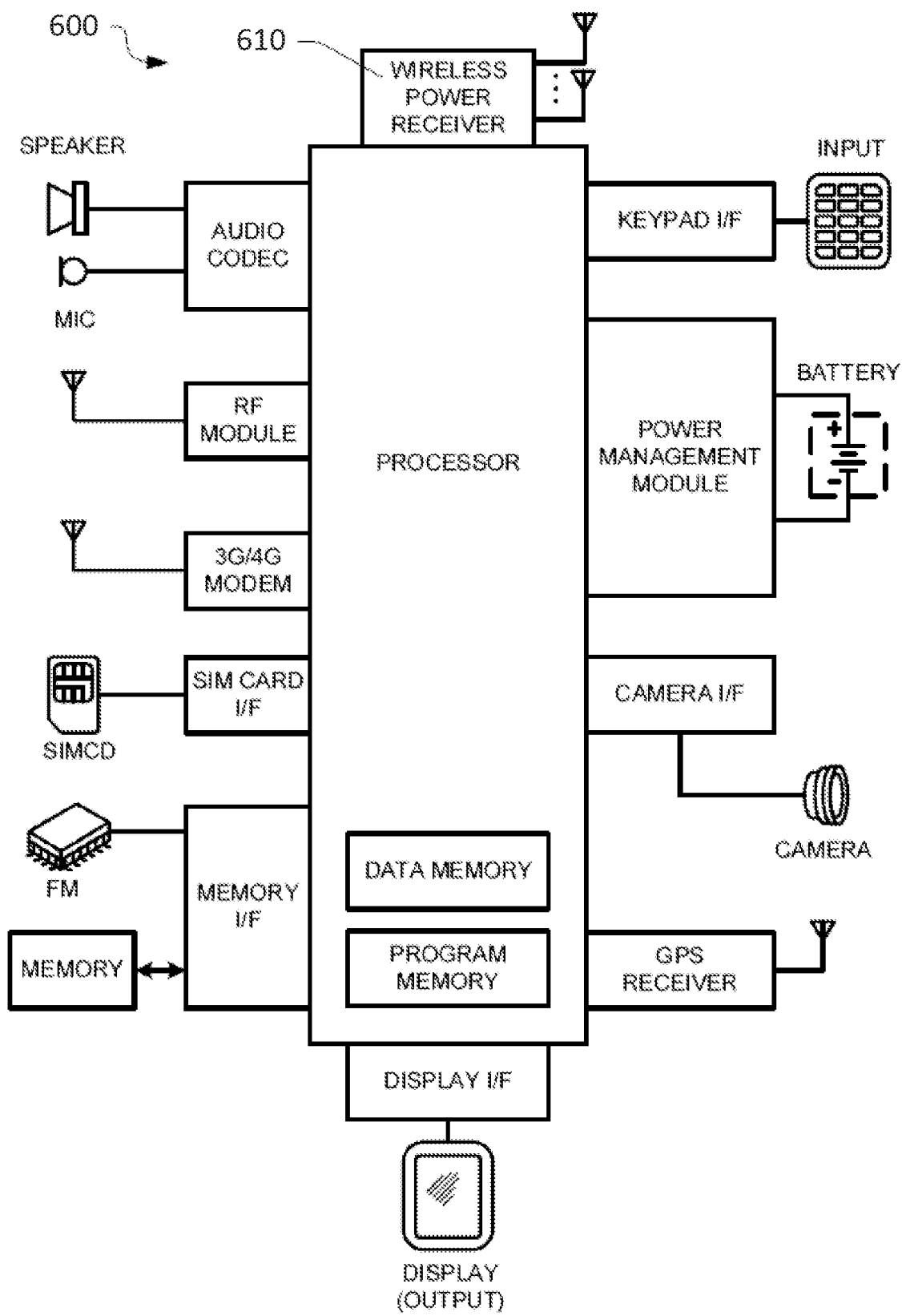
FIG. 6 is a block diagram of a computing device with a wireless power receiver, in accordance with certain embodiments of the present disclosure.

FIG. 6 depicts a block diagram of a computing device 600 with a wireless power receiver 610, in accordance with certain embodiments of the present disclosure. Computing device 600 includes any form of a computer with a wireless power receiver 610, such as a mobile (or smart) phone, tablet computer device, desktop computer device, laptop computing device, wearable computing device, or any other computing device for which wireless power charging could be applicable, in accordance with various embodiments herein. The wireless power receiver 610 may be implemented as the electronic device 300 with WPR 301 having controller 308, or any combination thereof. Further, wireless power receiver 610 may execute and perform any of the methods and functions described herein according to the present technology and with reference to the WPR 301 and the various components thereof.

Various interfaces and modules are shown in or coupled to the computing device 600; however, computing device 600 does not require all of such modules or functions for performing the functionality described herein. It is appreciated that, in many embodiments, various components are not included or necessary for operation of the respective computing device. For example, components such as global positioning system (GPS) radios, cellular radios, SIM cards, cameras, and accelerometers, as well as other components, may not be included in some implementations of a computing device. Further, one or more of the components or modules shown may be combined or removed.

For example, with the wireless power receiver 610 implemented, the battery, power management module, or both may be redundant in some embodiments, such as if all power management functions for the computing device 600 are built into the wireless power receiver 610. Further, a battery might not be necessary in embodiments that receive constant power via the wireless power receiver 610.

Figure 7:
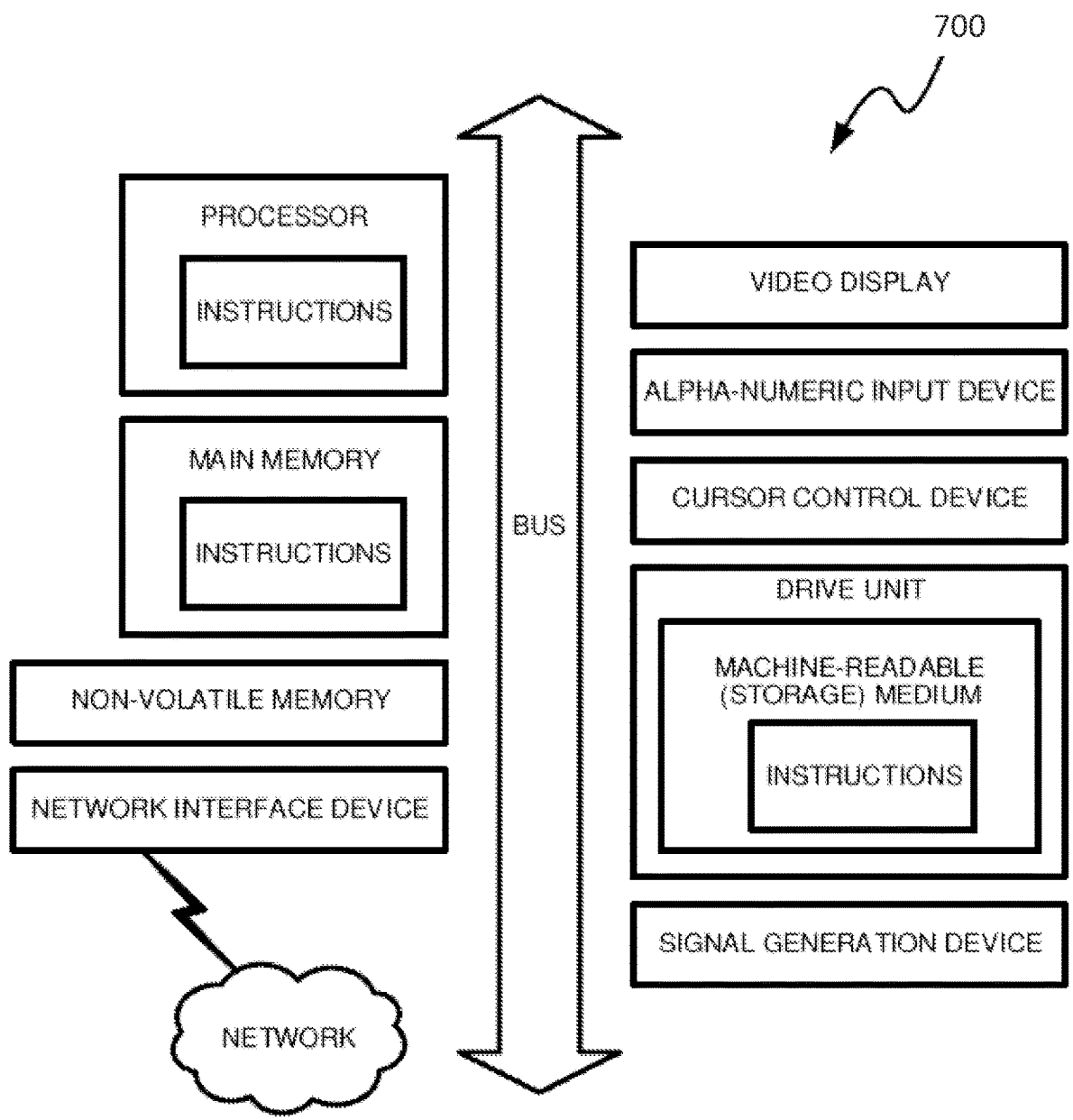
FIG. 7 is a diagrammatic representation of a machine, in the example form, of a computer system within which a set of instructions, for causing the machine to implement or otherwise perform any one or more of the techniques and methodologies of the present technology described herein, may be executed.

FIG. 7 is a diagrammatic representation of a machine, in the example form, of a computer system 700 within which a set of instructions, for causing the machine to implement or otherwise perform any one or more of the techniques and methodologies of the present technology described herein, may be executed. Computer system 700 may, for some embodiments of the present technology, be representative of controller means including, without limitation, controller 210 WPTS 200 or controller 308 of WPR 301.

In the example of FIG. 7, the computer system 700 includes a processor, memory, non-volatile memory, and an interface device. Various common components (e.g., cache memory) are omitted for illustrative simplicity. The computer system 700 is intended to illustrate a hardware device on which any of the components depicted in the examples of FIG. 2 or FIG. 3 (and any other components described in this specification) can be implemented. For example, the computer system 700 can be any radiating object or antenna array system. The computer system 700 can be of any applicable known or convenient type. The components of the computer system 700 can be coupled together via a bus or through some other known or convenient device.

The processor of computer system 700 may be, for example, a conventional microprocessor such as an INTEL PENTIUM microprocessor or MOTOROLA POWER PC microprocessor. One of skill in the relevant art will recognize that the terms "machine-readable (storage) medium" or "computer-readable (storage) medium" include any type of device that is accessible by the processor. In some embodiment, these storage media are embodied in non-transitory computer-readable media that can store program instructions (e.g., as software or firmware) which, when executed by one or more processors of the disclosed technology (e.g., WPTS 200 or WPR 301), cause the controller means (e.g., controller 210 or controller 308) to implement, execute, or otherwise facilitate performance of the various algorithms and methods disclosed herein.

In computer system 700, the memory is coupled to the processor by, for example, a bus. The memory can include, by way of example but not limitation, random access memory (RAM), such as dynamic RAM (DRAM) and static RAM (SRAM). The memory can be local, remote, or distributed.

The bus of computer system 700 also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 700. The non-volatile storage can be local, remote, or distributed. The non-volatile memory is optional because systems can be created with all applicable data available in memory. An embodiment of computer system 700 will usually include at least a processor, memory, and a device (e.g., a bus) coupling the memory to the processor.

Software or firmware utilized by computer system 700 may be stored in the non-volatile memory and/or the drive unit. Indeed, for large programs, it may not even be possible to store the entire program in the memory. Nevertheless, it should be understood that for software and/or firmware to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, firmware or a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device of computer system 700. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system (e.g., 700) to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 7 reside in the interface.

In operation, the computer system 700 can be controlled by operating system software that includes a file management system, such as a disk operating system. One example of operating system software with associated file management system software is the family of operating systems known as WINDOWS from MICROSOFT Corporation of Redmond, Washington, and their associated file management systems. Another example of operating system software with its associated file management system software is the LINUX operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an IPHONE, a BLACKBERRY, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above detailed description using the singular or plural number may also include the plural or singular number, respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. For instance, the present technology may be beneficially applied by persons having ordinary skill in the art in applications other than wireless power delivery where characterizing a background signal or interfering noise is advantageous for further signaling operations. Likewise, the elements and acts of the various embodiments described above can be combined to provide further embodiments.

Embodiments of the present technology may be applied to, or make use of, technology described in patent applications invented and/or assigned to OSSIA Inc. of Redmond, Washington, USA. A non-exhaustive listing of such US patent application publications is as follows: 20220052560; 20220014049; 20210408833; 20210408832; 20210399587; 20210373117; 20210359553; 20210351616; 20210321472; 20210313845; 20210296943; 20210288529; 20210249910; 20210249909; 20210249908; 20210249903; 20210242723; 20210143682; 20210135493; 20210126492; 20210104918; 20210066962; 20210063525; 20210049975; 20200336015; 20200303954; 20200296780; 20200287423; 20200235614; 20200220391; 20200220387; 20200185972; 20200177031; 20200162122; 20200144864; 20200136712; 20200127704; 20200119593; 20200091968; 20200091773; 20200044489; 20200036233; 20200026673; 20200021142; 20200014251; 20190393736; 20190386521; 20190372400; 20190356050; 20190348872; 20190341811; 20190334386; 20190306735; 20190305604; 20190207430; 20190199404; 20190199145; 20190197984; 20190181698; 20190165615; 20190165599; 20190157915; 20190148990; 20190148950; 20190140490; 20190140487; 20190115792; 20190097465; 20190097464; 20190074732; 20190067825; 20190020199; 20180366085; 20180338252; 20180309329; 20180287418; 20180287417; 20180259615; 20180255596; 20180248399; 20180241254; 20180219585; 20180219426; 20180183275; 20180159373; 20180152024; 20180054088; 20170358959; 20170338698;

20170331331; 20170311288; 20170250474; 20170237298; 20170187249; 20170187231; 20160262131; 20160013685; 20150022022; 20140241231; 20140217967; and any and all patents or patent applications incorporated by reference therein.

Any patents or patent applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above detailed description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above detailed description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above detailed description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above detailed description section explicitly defines such terms. Accordingly, the actual scope of the invention encompasses not only the disclosed examples, but also all equivalent ways of practicing or implementing the invention.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A controller for a radio frequency (RF) receiver operable in a wireless signaling environment having a plurality of radio frequency (RF) signals originating from multiple sources utilizing multiple frequency bands, wherein the controller is configured to:
   determine an RF background signature based at least in part on one or more characteristics of the plurality of RF signals received via at least one antenna during a first period of time from the multiple sources;
   extrapolate at least part of the RF background signature in at least one frequency band of interest of the multiple frequency bands for use in a second period of time occurring, at least in part, after the first period of time; and
   identify, during the second period of time, a signature of a first RF signal of the plurality of RF signals received via the at least one antenna from a first source of the multiple sources utilizing the at least one frequency band of interest in the presence of at least a second RF signal of the plurality of RF signals.

2. The controller of claim 1, wherein the controller is further configured to sample, in the first period of time, one or more frequency bands of the multiple frequency bands including the at least one frequency band of interest.

3. The controller of claim 1, wherein the controller is further configured to determine the one or more characteristics of the plurality of RF signals for one or more frequency bands of the multiple frequency bands including the at least one frequency band of interest.

4. The controller of claim 1, wherein to extrapolate the at least part of the RF background signature, the controller is further configured to average at least a portion of background/interference components of the RF background signature in the at least one frequency band of interest.

5. The controller of claim 1, wherein to extrapolate the at least part of the RF background signature, the controller is further configured to perform an envelope extrapolation.

6. The controller of claim 5, wherein to perform the envelope extrapolation, the controller is configured to fit a mathematical polynomial to the one or more characteristics of the plurality of RF signals stored in a cyclic buffer as a function of time.

7. The controller of claim 1, wherein to extrapolate the at least part of the RF background signature, the controller is further configured to apply a machine learning algorithm to historical RF background signatures or characteristics of the plurality of RF signals in the wireless signaling environment.

8. The controller of claim 1, wherein to extrapolate the at least part of the RF background signature, the controller is further configured to estimate a future progression of the RF background signature into at least the second period of time.

9. The controller of claim 8, wherein the controller is further configured to remove the future progression of the RF background signature from the signature of the first RF signal to facilitate signal processing on at least a portion of the first RF signal.

10. A method in a controller for a radio frequency (RF) receiver operable in a wireless signaling environment having a plurality of radio frequency (RF) signals originating from multiple sources utilizing multiple frequency bands, wherein the method comprises:
determining an RF background signature based at least in part on one or more characteristics of the plurality of RF signals received via at least one antenna during a first period of time from the multiple sources;
extrapolating at least part of the RF background signature in at least one frequency band of interest of the multiple frequency bands for use in a second period of time occurring, at least in part, after the first period of time; and
identifying, during the second period of time, a signature of a first RF signal of the plurality of RF signals received via the at least one antenna from a first source of the multiple sources utilizing the at least one frequency band of interest in the presence of at least a second RF signal of the plurality of RF signals.

11. The method of claim 10 further comprising sampling, in the first period of time, one or more frequency bands of the multiple frequency bands including the at least one frequency band of interest.

12. The method of claim 10 further comprising determining the one or more characteristics of the plurality of RF signals for one or more frequency bands of the multiple frequency bands including the at least one frequency band of interest.

13. The method of claim 10, wherein extrapolating the at least part of the RF background signature comprises averaging at least a portion of background/interference components of the RF background signature in the at least one frequency band of interest.

14. The method of claim 10, wherein extrapolating the at least part of the RF background signature comprises performing an envelope extrapolation.

15. The method of claim 14, wherein performing the envelope extrapolation comprises fitting a mathematical polynomial to the one or more characteristics of the plurality of RF signals stored in a cyclic buffer as a function of time.

16. The method of claim 10 wherein extrapolating the at least part of the RF background signature comprises applying a machine learning algorithm to historical RF background signatures or characteristics of the plurality of RF signals in the wireless signaling environment.

17. The method of claim 10, wherein identifying the signature of the first RF signal comprises identifying at least a portion of the first RF signal encoding data uniquely identifying the first source in the wireless signaling environment.

18. The method of claim 17 further comprising ascertaining, based on the data uniquely identifying the first source, that the first source is authorized to receive a responsive RF signal.

19. The method of claim 18 further comprising causing the responsive RF signal to be transmitted to a location of the first source in response to the ascertaining.

20. One or more non-transitory computer readable media having stored thereon program instructions which, when executed by at least one processor, cause a machine to:
determine a radio frequency (RF) background signature based at least in part on one or more characteristics of a plurality of RF signals received during a first period of time by an RF receiver from multiple sources utilizing multiple frequency bands in a wireless signaling environment;
extrapolate at least part of the RF background signature in at least one frequency band of interest of the multiple frequency bands for use in a second period of time occurring, at least in part, after the first period of time; and
identify, during the second period of time, a signature of a first RF signal of the plurality of RF signals received by the RF receiver from a first source of the multiple sources utilizing the at least one frequency band of interest in the presence of at least a second RF signal of the plurality of RF signals.

* * * * *